CONTINUOUS DIGITAL ERROR CORRECTING SYSTEM

Filed May 1, 1958 9 Sheets-Sheet 1

INVENTOR
D. W. HAGELBARGER
BY Alan C. Rose
ATTORNEY

Oct. 11, 1960 D. W. HAGELBARGER 2,956,124

CONTINUOUS DIGITAL ERROR CORRECTING SYSTEM

Filed May 1, 1958 9 Sheets-Sheet 2

INVENTOR
D. W. HAGELBARGER
BY Alan C. Rose
ATTORNEY

Oct. 11, 1960 D. W. HAGELBARGER 2,956,124

CONTINUOUS DIGITAL ERROR CORRECTING SYSTEM

Filed May 1, 1958 9 Sheets-Sheet 3

INVENTOR
D. W. HAGELBARGER
BY Alan C. Rose
ATTORNEY

INVENTOR
D. W. HAGELBARGER
BY Alan C. Rose
ATTORNEY

INVENTOR
D. W. HAGELBARGER
BY Alan C. Rose
ATTORNEY

| PARITY CHECK INDICATION | | | REQUIRED ACTION |
|---|---|---|---|
| R | S | T | |
| 0 | 0 | 0 | NO ACTION REQUIRED |
| 0 | 1 | 0 | |
| 1 | 0 | 0 | |
| 1 | 1 | 0 | |
| 1 | 1 | 1 | CORRECT REGISTER 86 BETWEEN DIGIT POSITIONS 5 & 6 |
| 1 | 0 | 1 | " " 88 " " " 11 & 12 |
| 0 | 1 | 1 | " " 90 " " " 17 & 18 |
| 0 | 0 | 1 | CHECK DIGIT MAY BE CORRECTED AT END OF REGISTER 92 |

| | | | | | | | | | | | | | | | | | | | | | | |
|---|---|---|---|---|---|---|---|---|---|---|---|---|---|---|---|---|---|---|---|---|---|---|
| SR86 | 1 | 0 | 1 | 0 | 1 | | 0 | 0 | 0 | 0 | 0 | 0 | | 0 | 0 | 0 | 0 | 0 | 0 | | 0 | 0 |
| SR88 | 0 | 0 | 0 | 0 | 0 | | 0 | 1 | 0 | 0 | 0 | 1 | | 0 | 0 | 0 | 0 | 0 | 0 | | 0 | 0 |
| SR90 | 0 | 0 | 0 | 0 | 0 | | 0 | 0 | 0 | 0 | 0 | 0 | | 0 | 1 | 0 | 1 | 0 | 0 | | 0 | 0 |
| SR92 | 0 | 0 | 0 | 0 | 0 | | 0 | 0 | 0 | 0 | 0 | 0 | | 0 | 0 | 0 | 0 | 0 | 0 | | 0 | 1 |
| SR86-92 | 1 | 0 | 1 | 0 | 1 | | 0 | 1 | 0 | 0 | 0 | 1 | | 0 | 1 | 0 | 1 | 0 | 0 | | 0 | 1 |
| | | ↑ | | ↑ | | | ↑ | | ↑ | | ↑ | | | ↑ | | ↑ | | ↑ | | | ↑ | |

INVENTOR
D. W. HAGELBARGER
BY Alan C. Rose
ATTORNEY

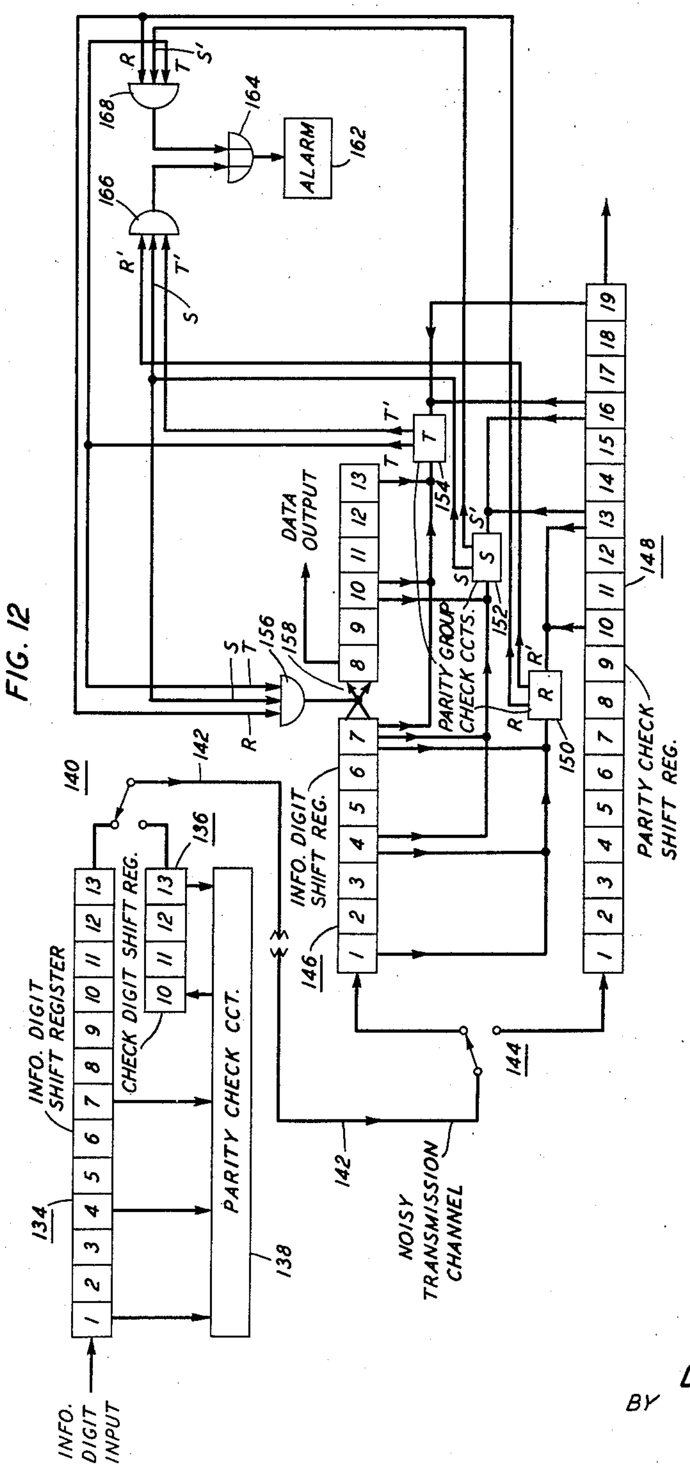
FIG. 12
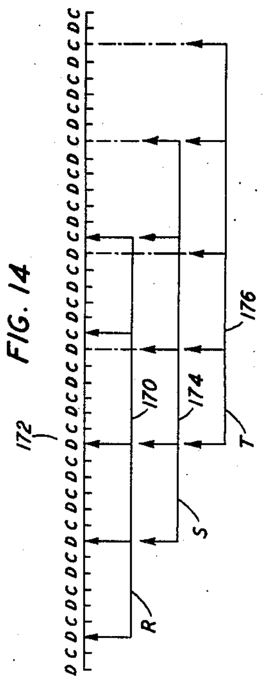
FIG. 14
FIG. 13
| R | S | T | ACTION |
|---|---|---|---|
| 0 | 0 | 0 | NO ACTION REQUIRED |
| 0 | 0 | 1 | |
| 0 | 1 | 1 | |
| 1 | 1 | 0 | |
| 1 | 0 | 0 | |
| 1 | 1 | 1 | CHANGE DATA BETWEEN 7&8 |
| 1 | 0 | 1 | ERROR INDICATION |
| 0 | 1 | 0 | |
INVENTOR
D. W. HAGELBARGER
BY Alan C. Rose
ATTORNEY

FIG. 15A

| | R | S | T | R | S | T | R | S | T |
|---|---|---|---|---|---|---|---|---|---|
| DIGIT A | 1 | 0 | 1 | 0 | 0 | 0 | 0 | 0 | 0 |
| DIGIT B | 0 | 0 | 0 | 1 | 1 | 0 | 0 | 0 | 0 |
| CHECK | 0 | 0 | 0 | 0 | 0 | 0 | 1 | 0 | 0 |

CHECK PATTERNS CORRESPONDING TO PARALLEL DECODER SHIFT REGISTERS

FIG. 15B

| A | B | C | A | B | C | A | B | C | A | B | C | A | B | C | A | B | C | A | B | C |
|---|---|---|---|---|---|---|---|---|---|---|---|---|---|---|---|---|---|---|---|---|
| 1 | 0 | 0 | 0 | 0 | 0 | 1 | 0 | 0 | 0 | 1 | 0 | 0 | 1 | 0 | 0 | 0 | 0 | 0 | 0 | 1 |

CHECK PATTERN CORRESPONDING TO DECODER HAVING SINGLE LONG SHIFT REGISTER

FIG. 15C

| A | B | A | B | A | B | A | B | A | B | A | B | A | B |
|---|---|---|---|---|---|---|---|---|---|---|---|---|---|
| 1 | 0 | 0 | 0 | 1 | 0 | 0 | 1 | 0 | 1 | 0 | 0 | 0 | 0 |

PATTERN FOR INPUT TO PARITY CHECK CIRCUIT AT ENCODER

FIG. 17

ENCODER TIMING

| CLOCK | 1 | 2 | 3 | 4 | 5 | 6 |
|---|---|---|---|---|---|---|
| INPUT | ← | A | → | ← | B | → |
| SHIFT | – | | | – | | |
| CALC. C | | – | | | | |
| OUTPUT | | A | | C | | B |

FIG. 18

DECODER TIMING

| CLOCK | 4 | 5 | 6 | 1 | 2 | 3 |
|---|---|---|---|---|---|---|
| INPUT | C | | B | | A | |
| SHIFT | – | | – | | – | |
| CONTENTS OF 1,28 | C | C | B | B | A | A |
| CALCULATE R,S,T | | | | | | – |
| CORRECT IF NEG. | – | | | | | |
| OUTPUT | A | | | B | | |

INVENTOR
D. W. HAGELBARGER
BY Alan C. Rose
ATTORNEY

INVENTOR
D. W. HAGELBARGER
BY Alan C. Rose
ATTORNEY

United States Patent Office 2,956,124

Patented Oct. 11, 1960

2,956,124

CONTINUOUS DIGITAL ERROR CORRECTING SYSTEM

David W. Hagelbarger, Morris Township, Morris County, N.J., assignor to Bell Telephone Laboratories, Incorporated, New York, N.Y., a corporation of New York Filed May 1, 1958, Ser. No. 732,385

26 Claims. (Cl. 178—69)

This invention relates to data processing circuits and more particularly to digital error detection or correction circuits.

This application is a continuation-in-part of my application Serial No. 678,343, filed August 15, 1957, now abandoned.

When digital signals are transmitted over a noisy channel, errors may be recognized and either detected or corrected by increasing the redundancy of the system. Thus, in the most elementary systems of this type, errors may be detected if each digit is transmitted twice. Similarly, errors may be corrected on a two-out-of-three basis if each digit is transmitted three times.

A number of more refined error detection and correction systems which require less redundancy operate on a "parity check" principle. A "parity check" digit is a digit added to a group of binary digits to make the sum of the digits odd or even. Typical error correction systems which employ several partity checks to identify erroneous digits are disclosed in R. W. Hamming et al. Reissue Patent 23,601, granted December 23, 1952, in E. P. G. Wright, Patent 2,653,996, granted September 29, 1953, and in an article entitled "Coding for Noisy Channels" by Peter Elias, which appeared at pages 37 through 46 of the 1955 Institute of Radio Engineers Convention Record, part 4, section 14, Information Theory I.

The error correction systems of the prior art have generally been developed on the basis that the probability of the occurrence of errors in successive digits is unrelated to the occurrence of errors in the immediately preceding digit periods. However, it has recently been determined that errors in transmission systems actually tend to occur in bursts. Thus, for example, if one symbol in one hundred thousand is the average error rate on a given transmission system or data link, the probability that the next symbol following an erroneously transmitted symbol is also in error might rise to one in one hundred or one in ten. Most of the prior art systems of error correction are not capable of coping with error bursts.

Accordingly, a principal object of the present invention is the correction of bursts of errors.

In the few systems of the prior art which include circuitry for correcting multiple errors, the resulting circuits have been so complex in most cases as to make them impractical. Accordingly, another important object of the present invention is the simplification of circuits for correcting bursts of errors.

In accordance with the present invention, these objects are achieved through the use of encoding and decoding circuits which utilize shift registers, such as tapped delay line circuits, for example, and which process digital information on a continuous basis. In the encoder, successive parity checks are formed, and the parity check digits are interleaved with the information digits at a point spaced from any information digit included in the parity check. As the received digits are shifted through the shift register circuitry at the decoder, the validity of two different parity check groups which both include a given digit is checked, and corresponding parity check output signals are produced. The digit included in both check groups may then be corrected in accordance with the indicated parity output signals. Additional error correction and detection information may also be derived from the successive check output signals.

It is a feature of the invention that the encoder of a digital error detection or correction system include shift register circuitry, a circuit for forming check digits from other digits in the digital message to be transmitted, and a switching circuit for interleaving each check digit into the digital message to be transmitted at a point spaced from the digits which are checked by the check digit.

It is another feature of the invention that an error detection or correction system include a check digit encoder and a decoder which both include shift register circuitry, that the encoder form check digits which check a group of information and check digits, and that the decoder include a circuit for checking the validity of two check groups which both include a single transmitted digit, and for correcting the digit when necessary.

In accordance with an additional feature of the invention, the check digit formation circuit is connected to a group of digit positions in the encoder shift register circuitry, and is operative to form a new check digit each time digits are shifted by one digit position through the shift register circuitry; and the decoder includes at least one check circuit connected to a corresponding group of digit positions in the decoder shift register circuitry, which produces an output check signal each time received digits are shifted in the decoder shift register circuitry.

The use of error correction and detection circuits in which both the encoder and the decoder operate on a continuous basis results in an important advantage of the present invention. This technique permits considerable simplification in the present error burst correction circuitry as compared with other systems which required elaborate memory and buffer circuits.

Concerning a related aspect of error correction circuits, it is useful to recognize digital patterns in which the error correction capacity of the correction circuits is exceeded. Although this concept is discussed broadly in R. W. Hamming et al., Reissue Patent 23,601, it was only considered in a relatively superficial manner.

Accordingly, it is another object of the invention to improve digital error handling circuits by matching the error detection alarm circuits closely to the error correction capabilities of the correcting circuit.

This object is attained by the use of error classification circuits which are responsive to successive decoder parity check circuit output signals. The nature of the pattern of these parity output signals in successive time intervals indicates the type of error or burst of errors which is occurring. Following an identification of the type of error, successive additional parity check signals indicate whether or not the decoder error correction capabilities are exceeded for the particular type of error.

It is another feature of the invention that an error handling data processing circuit include parity check circuitry for providing error correction signals, and that error detection circuits are coupled to receive these error correction signals and energize an alarm circuit when the error correction capabilities of the decoder are exceeded. Furthermore, the error detection circuits may be responsive to the pattern of the error correction signals in successive time intervals to classify errors in received digits and may also include circuitry for ascertaining departure from correctable error sequences in each identified class of errors.

Other objects, features, and advantages of the invention will become apparent from a consideration of the following detailed description and the accompanying drawing, in which:

Fig. 12 is a block diagram of another illustrative error detection and correction system in accordance with the invention;

Fig. 13 is a table indicating the mode of operation of the circuit of Fig. 12;

Fig. 14 is a diagram which indicates the relationship of the decoder check circuits with the transmitted digits in the system of Fig. 12;

Figure 16:
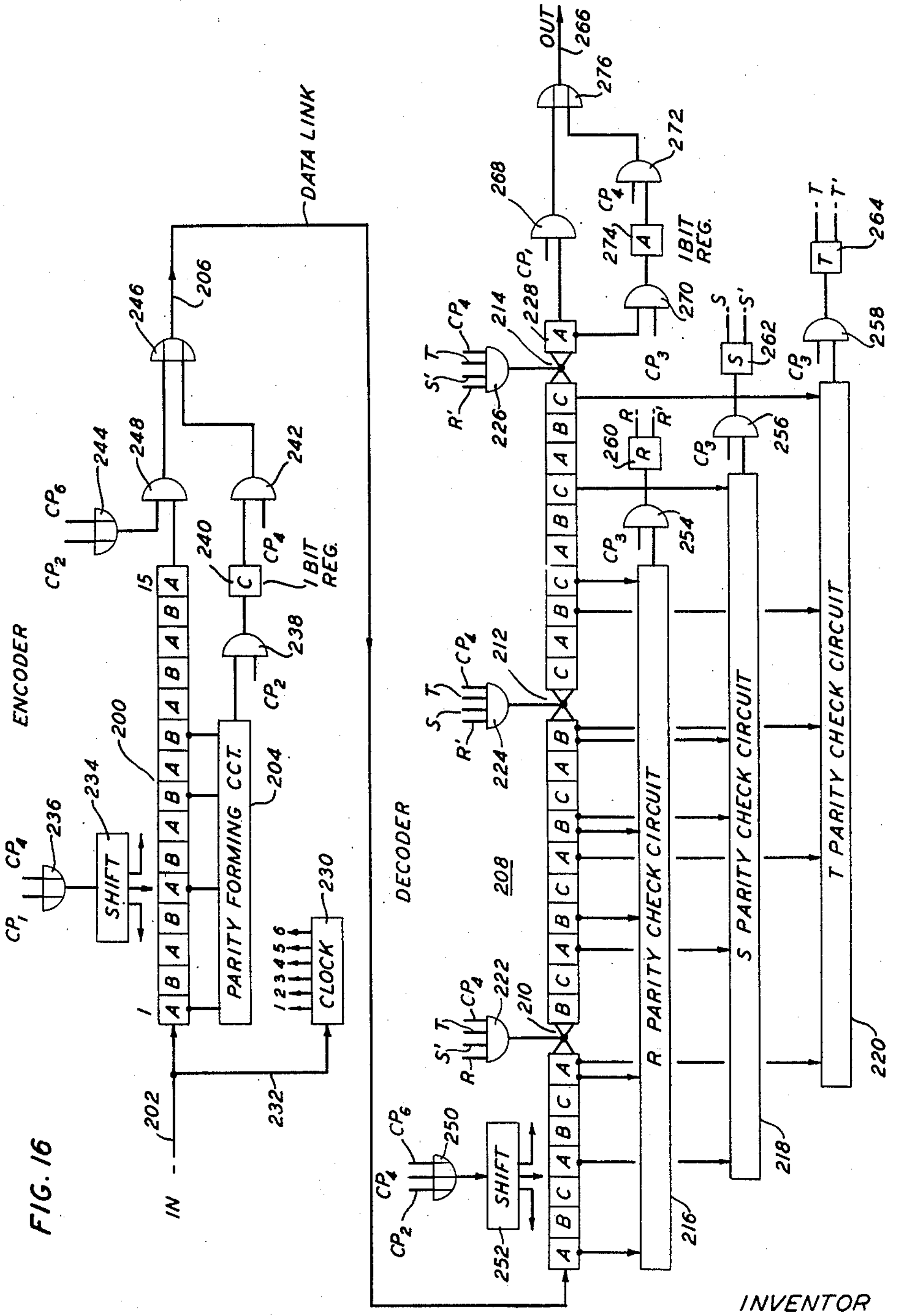

Figs. 15A, 15B, and 15C are diagrams indicating the parity check patterns for the data transmission system of Fig. 16;

Fig. 16 is an error correcting data transmission system in accordance with the invention in which one check digit is transmitted for every two information digits; and Figs. 17 and 18 are timing diagrams for the encoder and decoder, respectively, of Fig. 16.

Figure 1:
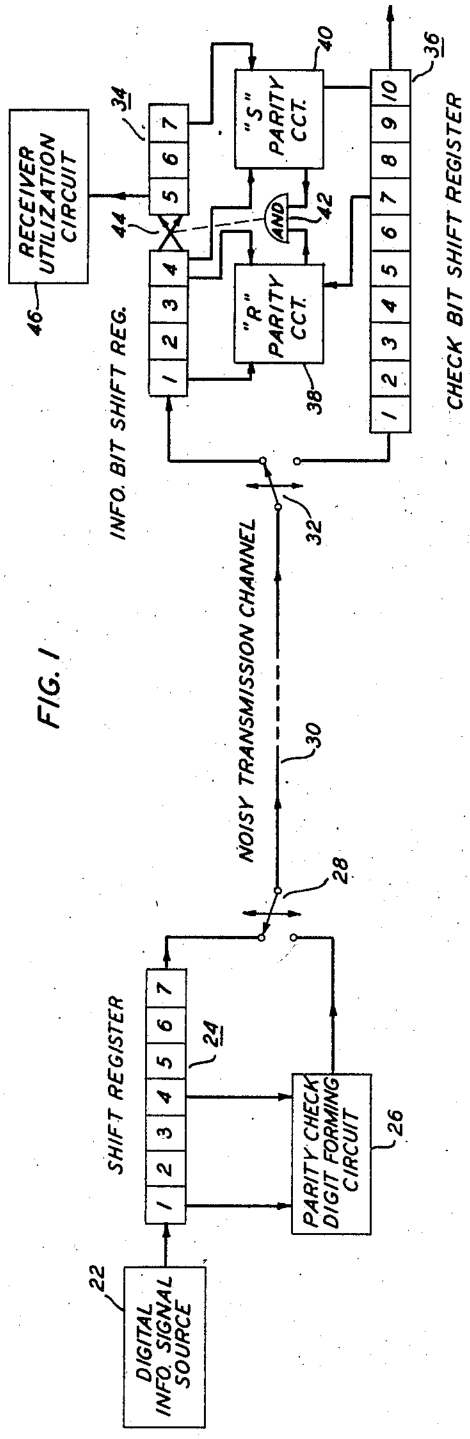
Fig. 1 is a block diagram of an illustrative error correction system in accordance with the present invention.

In the drawing, Fig. 1 shows one embodiment of the continuous error correction or detection systems of the present invention. In Fig. 1, digital information from a source 22 is supplied to the shift register 24. The successive digit positions in the shift register 24 are indicated by blocks designated 1 through 7. The term "shift register" as employed in the present specification and claims includes circuitry such as tapped delay lines in which samples may be taken from the delay lines in successive intervals.

Check digits are formed from some of the information digits in the shift register 24 by the parity check digit encoding circuit 26. The check digits are interleaved with the information digits by the switching circuit 28, and the resulting digital message is transmitted over a noisy transmission channel or data link 30. It may be noted that the parity check forming circuit 26 has inputs from digit positions 1 and 4 in the shift register 24, and that the parity check digit is inserted into the transmitted message at a point spaced from digit position 4 by several additional information and check digits. This spacing of the digits included in each parity check group permits the correction of bursts of errors which are equal to or less than six digit periods in length, as will be explained in greater detail below.

The use of parity checks for error detection or correction is well known, and examples of their use for these purposes are set forth in the R. W. Hamming et al. patent cited above. In brief, however, it might be noted that a parity check digit may be formed by the sum of a group of binary numbers, neglecting carries. Thus, with reference to Fig. 1, the relation between each check digit and the information digits over which the check is made may be indicated by the following equation:

$$D_1+D_4=C(\text{Mod } 2) \quad (1)$$

where $D_1$ and $D_4$ are the binary digits in shift register digit positions 1 and 4, respectively, and C is the resulting check digit. Thus, for example, if both of the information digits in the digit positions 1 and 4 are binary "1's", or if they are both "0's", the check digit is a "0". However, if only one of the two information digits is a "1", then the parity check bit is also a "1".

The decoder is shown to the right in Fig. 1. Binary digits, or "bits", from the noisy transmission channel 30 are separated by the switching circuit 32, with the information bits being routed to the information bit shift register 34 and check bits being applied to the check bit shift register 36.

It has been noted above that parity check groups each including two information bits and one check bit were formed at the encoder. It may also be noted that each information bit is first included in one parity check group when it is in digit position 1 in shift register 24 of the encoder, and that it is subsequently included in another parity check group when it is in digit position 4 in the shift register. At the decoder, the validity of these two parity check groups is examined simultaneously by the "R" parity check circuit 38 and the "S" parity check circuit 40. Thus, the parity check circuit 38 derives signals from digit positions 1 and 4 of the information bit shift register 34 and from digit position 7 of the check bit register 36. Similarly, parity check circuit 40 derives information from digit positions 4 and 7 of register 34, and from digit position 10 of the check bit register 36. The only digital input for both parity check circuits 38 and 40 is digit position 4 of information bit shift register 34. Accordingly, if both parity check circuits 38 and 40 indicate an error in parity, digit 4 is most probably in error. Accordingly, the AND circuit 42 is energized to enable the correction switch 44.

It may also be noted that an error indication from the parity check circuit 40 but not from the parity check circuit 38 clearly indicates that check bit 10 is in error. This statement is the result of a process of elimination. The parity check circuit 40 has two other inputs, from digit position 4 and digit position 7 of register 34. If the information bit in digit position 4 were in error, an error signal would appear at the output of both parity check circuits 38 and 40, so this possibility is eliminated. The information bit in digit position 7 is not in error, as all information bits are corrected between digit positions 4 and 5 in shift register 34. Accordingly, only the check bit 10 can be in error. If the circuit shown as the decoder is to be employed as a relay station for further transmission over additional noisy channels, correction circuitry may be provided for changing the state of the check bit in digit position 10 of register 36 upon the occurrence of an error indication from parity check circuit 40 but not from parity check circuit 38.

It may be noted that the receiver utilization circuit 46 is coupled to the output from digit position 5 of the information bit shift register 34. Digit position 5 is selected in order to minimize delays, as digit position 5 is the first point at which the corrected information digits are available. If the receiver utilizaiton circuit 46 were coupled to digit position 7 of the shift register 34, a delay of two additional shift register intervals would be introduced.

Figure 2:
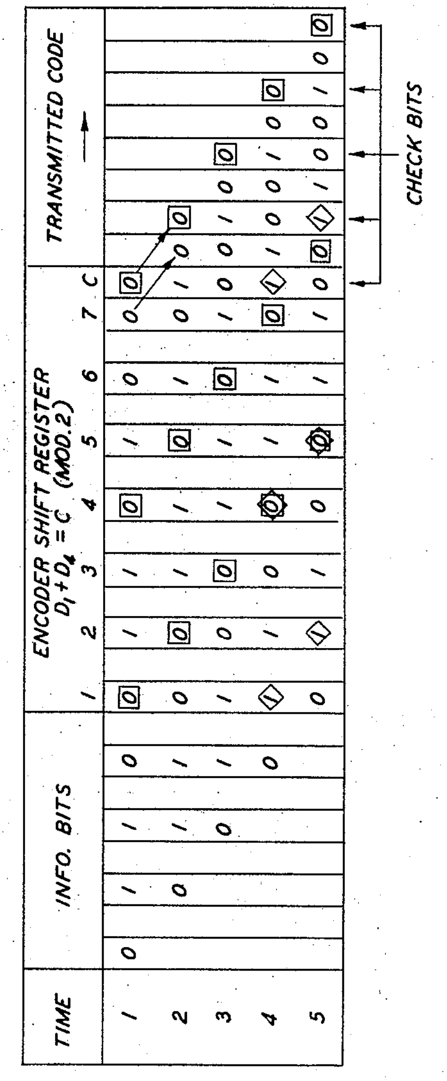
Fig. 2 is a diagram which is useful in describing the mode of operation of the system of Fig. 1.

The diagram of Fig. 2 indicates the mode of operation of the circuit of Fig. 1 in somewhat greater detail. In the diagram of Fig. 2, a sequence of information bits is assumed, and the resulting check bits and the transmitted code are shown. Successive rows in the circuit of Fig. 2 indicate successive shift intervals in the shift register 24 of Fig. 1. In the initial condition shown in the upper row of the diagram of Fig. 2, digit positions 1 and 4 both include "0's." Accordingly, the check digit shown at the right-hand side of the shift register in a column designated C is also a "0." In the next shift period, as indicated by the second row of the diagram of Fig. 2, the check digit and the information digit which had been in digit position 7 are both transmitted. It may be noted that one check digit is developed during each shift interval, and that both an information digit and a check digit are transmitted during each shift interval of register 24.

To keep track of two parity check groups in a simple manner in the diagram of Fig. 2, the three bits making up one parity check group are identified by a square which encloses the bits. A second parity check group is identified by a diamond which encloses each bit included in the check group. It may be observed that the information digit that was initially in digit position 1 of the shift register in the top row in the diagram of Fig. 2 is shifted to digit position 4 in the fourth row in the diagram of Fig. 2. Thus, it is included in the parity check group identified by the squares and is also included in the check group identified by the diamonds. In the decoder, this digit which is included in the two parity check groups is eventually located in digit position 4 of shift register 34. At this time, the parity check circuits 38 and 40 determine the validity of the parity check groups indicated by the diamonds and squares, respectively, in Fig. 2, and correct the common digit when such action is required.

Figure 3:
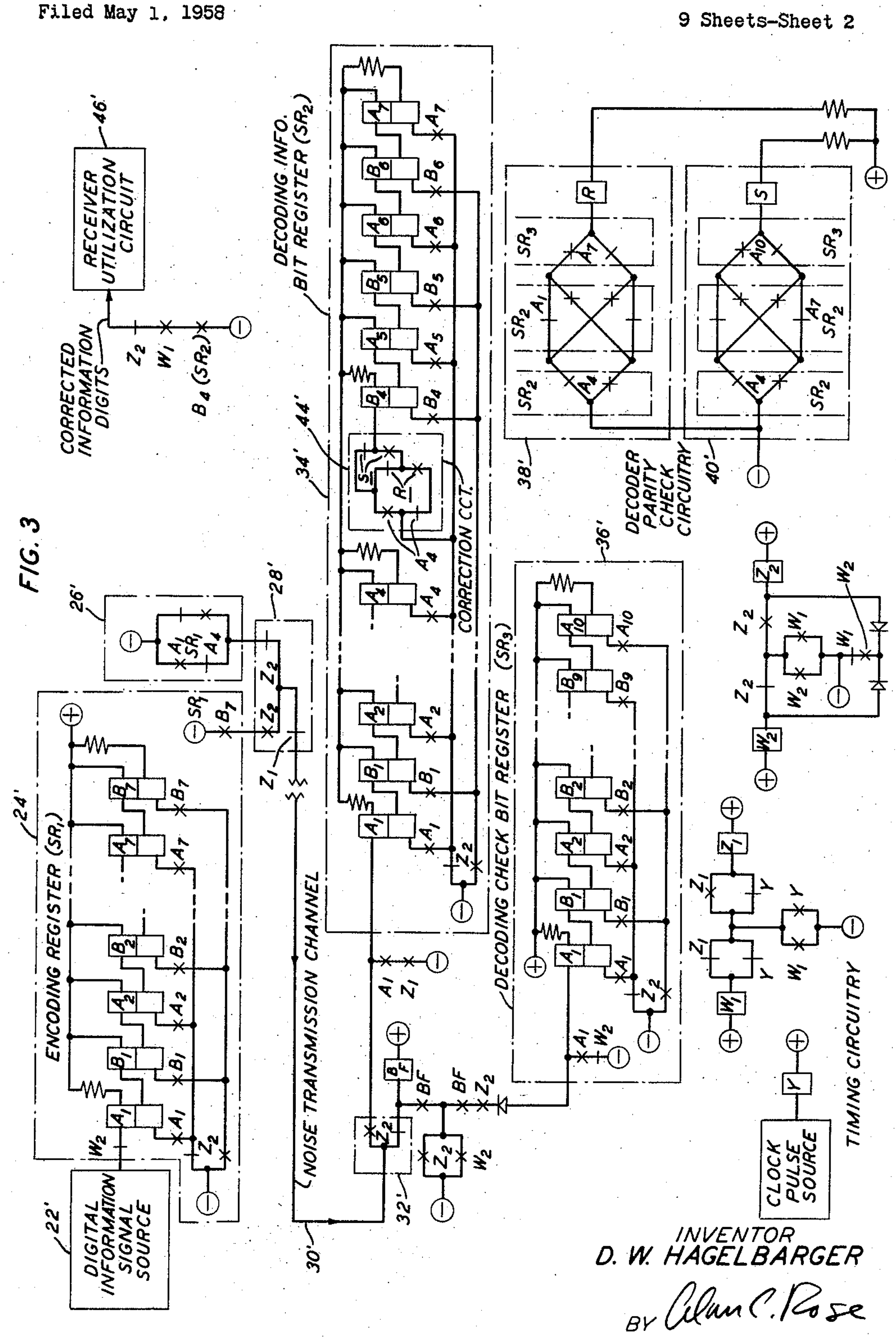
Fig. 3 is a detailed circuit diagram of the system of Fig. 1.

Fig. 3 is a detailed circuit diagram of a relay implementation of the system of Fig. 1. In order to simplify the circuit and to avoid cross connections, the detached contact method of representing relay circuitry has been employed. In this method of representation, a relay is designated by a capital letter and a subscript, and its associated contacts are designated in the same manner. The "make" contacts of a relay which are closed when the relay is energized are indicated by a cross in the lead in which the contacts are located. The symbol for make contacts for relay $A_1$ has the following appearance.

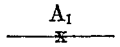

Break contacts are represented by a short straight line perpendicular and crossing the lead in which the contacts are located. The symbol for the break contacts for relay $A_1$ has the following appearance.

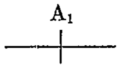

To facilitate the identification of portions of the circuit of Fig. 3 with the corresponding circuitry of Fig. 1, the major components in Fig. 3 are identified by the same reference numerals which are employed in Fig. 1 with the exception that the reference numerals in Fig. 3 are primed. Thus, for example, the digital information source 22' is coupled to the encoding shift register 24' in Fig. 3 in the same manner that the source 22 is coupled to the shift register 24 in Fig. 1. Other components in Fig. 3 which have corresponding circuits in Fig. 1 include the parity check circuit 26', the switching circuits 28' and 32', the transmission channel 30', the receiver shift registers 34' and 36', the parity group checking circuits 38' and 40', the correction circuit 44', and the reeiver utilization circuit 46'. It may also be noted that the switching circuit 44' of Fig. 3 performs the function indicated by the AND circuit 42 as well as the correction circuit 44 of Fig. 1.

In the implementation of the error correcting system shown in Fig. 3, various synchronizing pulses are required. In the actual embodiment shown in Fig. 3, it has been assumed that synchronizing signals are available at both the transmitter and the receiver. To avoid the use of a separate channel for synchronizing signals, conventional synchronizing signal recovery circuitry may be employed at the decoder.

Three timing or synchronizing circuits are shown in the lower left-hand portion of Fig. 3. These three circuits are simple frequency division circuits such as those described in standard texts such as "The Design of Switching Circuits" by William Keister et al., D. Van Nostrand Company, Inc., New York, 1951. In brief, however, the relays $W_1$ and $Z_1$ operate at one-half the rate of the relay Y, and are staggered in time in their operation with respect to each other. Similarly, the relays $W_2$ and $Z_2$ operate at one-half the rate of the relays $W_1$ and $Z_1$, and are also staggered in time in their operation with respect to each other. It should be noted particularly that these timing relays are designated $W_1$, $Z_1$, $W_2$, and $Z_2$ in view of the fact that the contacts of these timing relays appear at various points in the circuit of Fig. 3 at points remote from the timing circuitry.

Proceeding to a detailed consideration of the circuit of Fig. 3, the timing of information signals from the source 22' is controlled by the break contacts $W_2$. The shift register 24' includes seven pairs of relays, each designated by the capital letters A or B and the appropriate subscripts 1 through 7. Each of the relays includes two coils, as indicated by the upper and lower sections of each relay. Transfers of information through the shift register are controlled by the pair of make and break contacts associated with the relay $Z_2$ which appear in the lower left-hand portion of the shift register 24'. The relay $Z_2$ is energized for a time period which overlaps the energization of the relay $W_2$, and the relay $W_2$ is de-energized before relay $Z_2$. Following the de-energization of relay $Z_2$, both relays are de-energized for a brief period prior to the energization of relay $W_2$.

Information is received by the relay $A_1$ when the break contacts $W_2$ are closed. At this time, the make contacts on relay $Z_2$ are still closed. When relay $Z_2$ changes state, the break contacts are closed before the make contacts are released. The relay $A_1$ retains the state it had prior to the de-energization of relay $Z_2$, in view of the make contacts $A_1$, which provide a hold circuit for relay $A_1$ through break contacts $Z_2$. In addition, when the break contacts of relay $Z_2$ are closed, relay $B_1$ assumes the state of relay $A_1$.

When relay $Z_2$ is energized once more, information is shifted from relay $B_1$ to relay $A_2$ in much the same manner as indicated above. The energization of relay $Z_2$ and the opening of the break contacts $Z_2$ perform the collateral function of de-energizing relay $A_1$ preparatory to receiving additional input information from the source 22'. In a similar manner, information is transferred from the "A" set of relays to the "B" set of relays, and back to the "A" set of relays throughout the shift register 24' and the other shift registers 34' and 36' in the circuit of Fig. 3.

The parity check circuit 26' is a simple contact network which includes sets of make and break contacts associated with the relays $A_1$ and $A_4$. The circuit 26' includes make contacts $A_4$ in series with break contacts $A_1$, and another series circuit including break contacts $A_4$ and make contacts $A_1$, in parallel with the other series circuit. The parity check circuit 26' therefore assumes one state when the two relays have the same energization states, and the other state when only one of the two relays is energized.

The switching circuit 28' alternately samples the output of the final relay $B_7$ in the shift register and the output of the parity check circuit 26' as the timing relay $Z_2$ is energized and de-energized. The relay $Z_1$, which operates at a higher rate of speed than the relay $Z_2$, performs a sampling function to produce pulses of appropriate length for application to the transmission channel 30'.

The switching circuit 32' at the input to the receiver also includes a pair of make and break contacts associated with the timing relay $Z_2$. The output signals from switching circuit 32′ are routed to the information bit register 34′ and the check bit register 36′. A buffer relay designated "BF" serves to synchronize the input signals applied to the two shift registers. Each of the shift registers 34′ and 36′ is provided with switching circuits timed by relay $Z_2$ as described above in connection with the encoding register 24′. The correction circuit 44′ is included in the middle of shift register 34′. The parity group check circuits 38′ and 40′ control the energization of relays R and S which in turn control the correction circuitry 44′.

The parity of the first and fourth information bit and the seventh check bit is examined in the parity group check circuit 38′. This is indicated by the presence of contacts associated with relays $A_1$ and $A_4$ of shift register $SR_2$, and the presence of contacts associated with relay $A_7$ of shift register $SR_3$ in the energization circuit of relay R. Similarly, the energization circuit for relay S in the check circuit 40′ includes contacts designated $A_4$ and $A_7$ from shift register $SR_2$, and contacts $A_{10}$ associated with the check shift register $SR_3$.

It will be recalled that it is desired to reverse the information digit between digit positions 4 and 5 in shift register 34 when both of the parity group check circuits at the decoder fail. In the circuit of Fig. 3, this situation is indicated by the energization of both relay R and relay S. In the examination of the contacts included in the correction circuit 44′, it may be observed that make contacts on relays R and S are included in series with the break contacts of relay $A_4$ in the energization circuit for relay $B_4$. Thus, if relay $A_4$ is de-energized, the energization of both relay R and relay S produces the reverse state in relay $B_4$ upon the occurrence of a shift signal. Similarly, the break contacts of relays R and S are connected in series with the make contacts of relay $A_4$ to preclude the energization of relay $B_4$ when relay $A_4$ has been energized. However, when only one of relays R and S is energized, the state of relay $A_4$ is transferred to relay $B_4$. Accordingly, information digits are corrected when and only when both relays R and S are energized.

The receiver utilization circuit 46′ receives input signals from relay $B_4$, which is the first point in shift register 34′ at which the corrected information digits are available. The make contacts $W_1$ and the break contacts $Z_2$ perform timing functions and gate an accurately timed output signal pulse to the utilization circuit 46′.

The circuit of Fig. 1 operates properly to correct bursts of six errors or less. When bursts of greater length occur, it would be desirable to energize an alarm circuit. Most of these longer bursts may be detected by examining the sequence of output signals from the R and S parity circuits. Certain types of errors which may, for example, change the original message to another message which has information and check digits arranged in a manner corresponding to a correct message will, of course, go undetected. In addition, if two check bits which are spaced by exactly six digit spaces in the transmitted message are reversed, this error combination will result in the reversal of a correct information digit.

Figure 4:
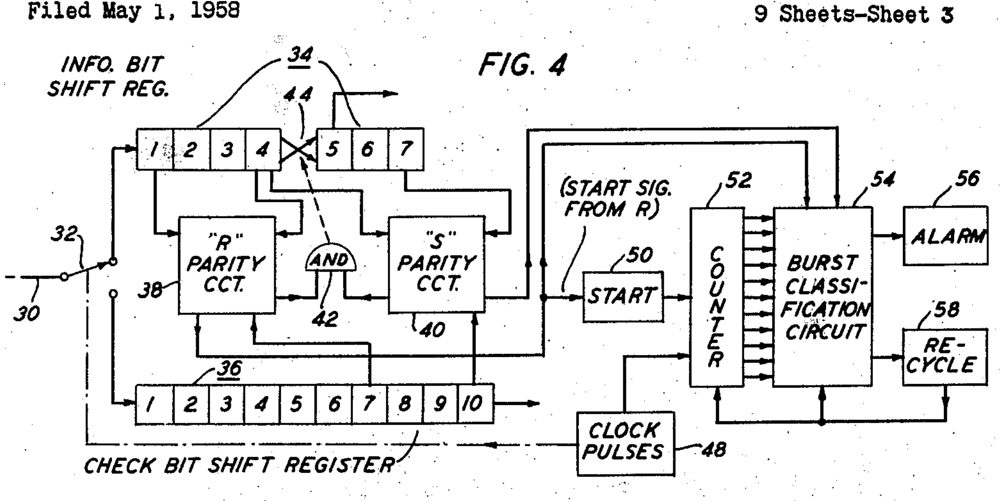
Fig. 4 is a block diagram of an error detection circuit which may be employed with the circuit of Fig. 1.

However, the great bulk of bursts of length greater than six digits may be detected by a relatively simple circuit which is shown in block diagram form in Fig. 4. Fig. 4 shows the receiver and error correction circuitry of Fig. 1 as well as certain additional error detection circuitry. The error detection circuit shown in Fig. 4 includes the source of clock pulses 48, a start circuit 50, a counter or stepping circuit 52, a burst classification circuit 54, an alarm circuit 56, and a recycling circuit 58. In operation, the occurrence of an output signal from the R parity group checking circuit 38 initiates the operation of the counter circuit 52. The circuit 54 compares the output signals from the parity group check circuits 38 and 40 during successive time periods with outputs which occur during correctable bursts which can be handled by the error correction circuitry. For the purposes of making this comparison, the correctable bursts are classified by the circuit 54. Signals from the parity check circuits 38 and 40 are applied to the burst classification circuit 54 during successive shift intervals as counted out by circuit 52. The bursts are tentatively classified as information digit or check digit errors. Once the initial classification of the output signals from the check circuits has been made, departures from correctable code sequences may be more readily ascertained. When such a departure occurs, the alarm circuit 56 is energized. Upon the completion of a fully identified correctable burst, the recycle circuit 58 is energized, and the components of the error correction circuitry are reset to their initial states.

Figure 5:
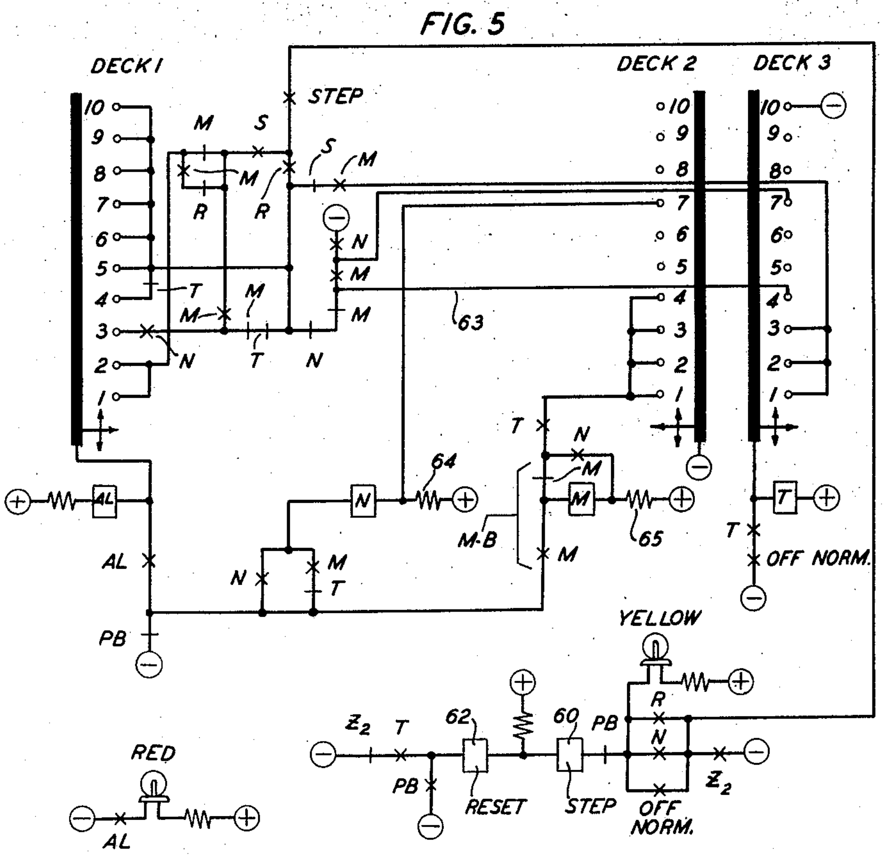
Fig. 5 is a detailed circuit diagram of the error detection circuitry shown in Fig. 4.

Fig. 5 represents a relay circuit instrumentation of the error detection circuitry shown in Fig. 4. The notation employed in Fig. 3 is also utilized in Fig. 5. The relays R, S, and $Z_2$ appear in Fig. 3. However, relay contacts associated with the parity group check relays R and S and the timing relay $Z_2$ appear in the circuit of Fig. 5.

A principal circuit component which appears in Fig. 5 is a stepping switch. The stepping switch includes a stepping coil 60, a reset coil 62, and three decks of contacts, each of which includes an "off" position, and ten contacts which are designed to be contacted successively by the movable contacts of the switch. The stepping switch also includes contacts designated "off normal" which appear at two points in the circuit diagram of Fig. 5. The off normal contacts are closed whenever the stepping switch is stepped away from its normal, or rest, position. Thus, for example, following an initial pulse applied to the stepping coil 60 by the closure of the make contacts R associated with relay R of Fig. 3, the off normal make contacts permit the continued advancement of the stepping switch by shift pulses from the make contacts $Z_2$. The circuit of Fig. 5 essentially classifies errors into two principal categories. Following this tentative classification, the sequence of operation of the parity check circuits R and S is examined, and bursts which are beyond the correction capabilities of the circuit cause the energization of the alarm relay AL in Fig. 5.

Figure 6:
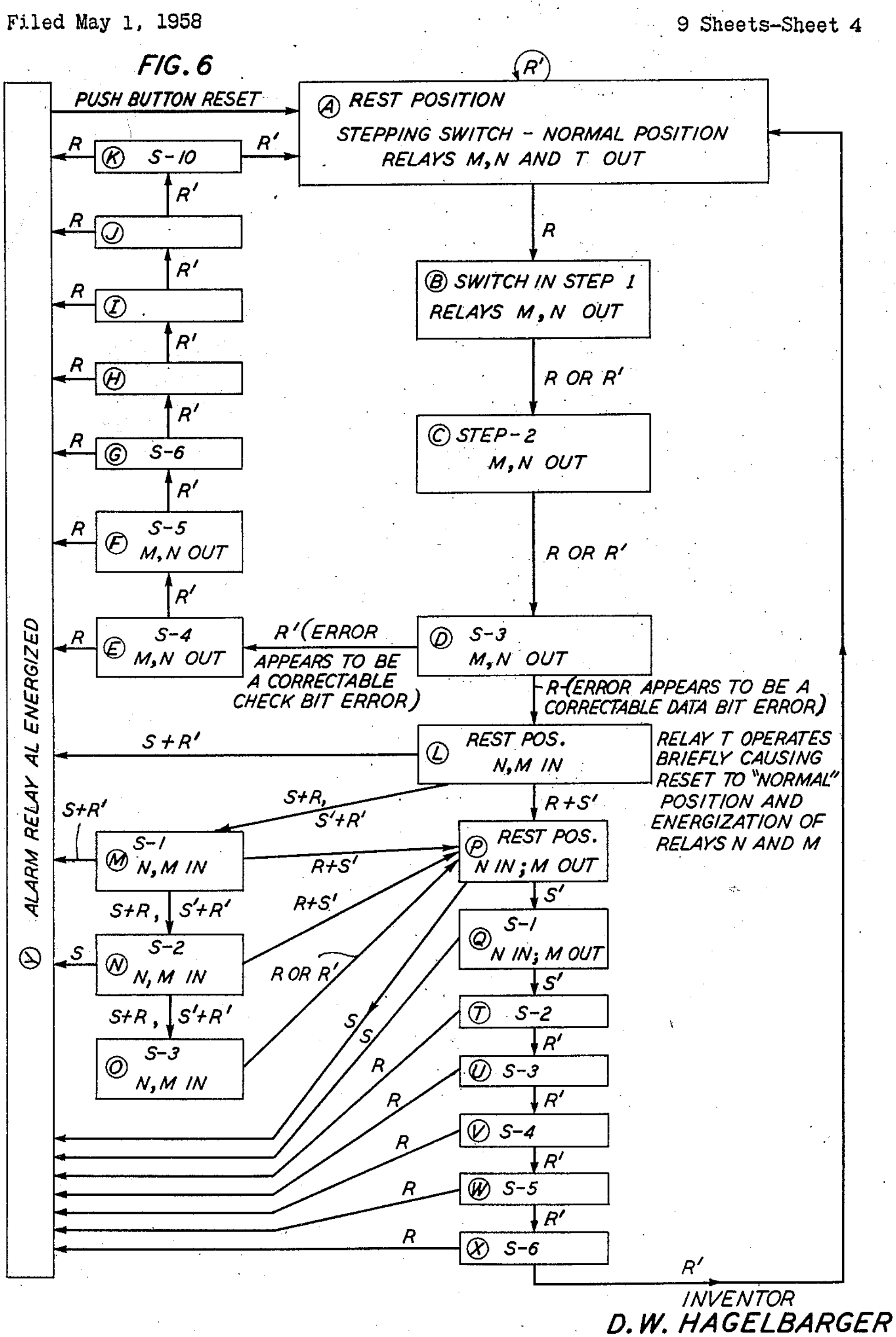
Fig. 6 is a state diagram for the error detection circuit of Fig. 5.

The mode of operation of the circuit of Fig. 5 may best be described by reference to the state diagram shown in Fig. 6. In general, errors are initially classified as being potentially correctable errors or bursts of errors which start with either an erroneous check bit or an erroneous information bit. In Fig. 6, this determination is made following the state designated by the encircled letter D. More particularly, with reference to Fig. 6, the rest position of circuit 5 is indicated by the large box designated by the encircled letter A at the top of the diagram. This rest position represents the circuit of Fig. 5 in its normal state. Under these circumstances, the stepping switch is in its normal position with the movable switches associated with each deck in the positions shown in Fig. 5, and all of the relays AL, M, N, and T are in the released positions.

In the absence of parity failures as detected by the R parity circuit 38 of Fig. 4, the circuit of Fig. 5 remains in this rest position. Upon the occurrence of an R parity circuit failure, the stepping switch is advanced to step 1. In this state, designated by the encircled letter B in Fig. 6, the relays M and N are still de-energized. In Fig. 6, it may be noted that each arrow designating a transition from one state to another is identified by one or more of the letter designations R, R′, S, or S′. The designation R indicates a failure of parity as determined by the R parity circuit 38 of Fig. 4. The absence of an R circuit parity failure is indicated by the designation R′. Similarly, the letter designations S and S′ indicate a parity check failure or the absence of a parity check failure, respectively, of the S parity circuit 40 of Fig. 4.

Each cycle of operation of the clock relay $Z_2$ in Fig.

5 is represented by a change of state arrow in Fig. 6. Thus, during cycles in which the R parity circuit does not fail, the state of the circuit of Fig. 5 follows the arrow designated R′ associated with state A in Fig. 6. Thus, although the state of Fig. 5 actually does not change, it may be considered from a state diagram standpoint to follow the arrow R′ from state A back to the same state A. The arrow intercoupling states A and B is designated R, indicating that the failure of parity as represented by an R parity signal causes this transition. The steps to states C and D are accompanied by advancing of the stepping switch to steps 2 and 3, respectively, regardless of parity input signals during these stepping intervals.

From state D, the circuit of Fig. 5 advances to state E or state L, depending on the nature of the parity signal from the R parity circuit. If there is no output from the R parity circuit as represented by the symbol R′, the error appears to be a correctable check bit error, and the circuit of Fig. 5 is switched to state E of Fig. 6. However, if the parity circuit 38 indicates parity failure, the circuit of Fig. 5 is switched to state L, indicating that the error appears to be a correctable data bit error.

The physical significance behind these alternative classes of errors may be noted from an examination of the upper and lower shift registers in Fig. 4 and the connections to the R parity circuit 38. More precisely, upon the occurrence of the initial R parity failure signal which caused the transition from state A to state B, either the information bit in the first stage of the upper shift register or the check bit in the seventh stage of the lower shift register may be in error. If the information bit is in error, a second R parity circuit failure will occur after three shift cycles. The resulting signal designated R produces the change from state D to state L, as indicated in Fig. 6. However, if the check bit in the seventh position of the lower register is in error, no further output indications of the R parity circuit are to be expected. Accordingly, the R′ signal identifies the transition between state D and state E in Fig. 6.

With reference to state E in Fig. 6, it may be noted that the stepping switch is in step position 4, and that relays M and N are "out," or de-energized. With reference to state L of Fig. 6, however, it may be noted that the stepping switch is in the rest position, and that relays N and M are "in," or in the energized state. The step-by-step correspondence between the state diagram of Fig. 6 and the circuit diagram of Fig. 5 will now be considered in some detail. Initially, and as mentioned above, the energization of the R make contacts energizes the stepping coil 60 and moves the stepping switch away from its normal, or rest, position. The off normal make contacts in parallel with the R make contacts then bypass the R contacts, and the $Z_2$ make contacts energize the stepping coil 60 during each cycle until the stepping switch is reset. Accordingly, the advance of the stepping switch to steps 1, 2, and 3 to produce states B, C, and D as shown in Fig. 6 is routine.

The following step 4, however, the branching of the state diagram requires the presence of the following circuitry in Fig. 5. In leaving state D, the stepping switch always steps up to level 4. Under these circumstances, if the R relay is energized relay T is energized through the path including lead 63, an M break contact, an N break contact, an R make contact, a make contact of the stepping switch, the lead at the upper and right-hand sides of the diagram of Fig. 5, and back through make contacts $Z_2$ to the negative potential point. The energization of relay T closes the T make contacts in series with the $Z_2$ break contacts and the reset coil 62. The stepping switch is therefore reset during the second half of the stepping cycle.

In the shift from state D to state L, it has been noted that relays N and M become energized. In this regard, the T make contacts in series with relay M and the negative potential point connected to deck 2 of the stepping switch cause the energization of relay M. Incidentally, the M relay has contacts arranged in a make-before-break sequence to permit the energization of the M relay through the M break contacts. In addition, the relay N is energized immediately following the de-energization of the T relay. The energization path for relay N begins with the negative potential point below deck 1 and passes through the push-button break contacts, the T break contacts and the M break contacts, the N relay coil itself, and the resistor 64. The N make contacts in shunt with the M make contacts and the T break contacts provide a holding circuit for relay N.

In the foregoing paragraph, the branching of the state diagram from state D to the states E and L, respectively, has been considered. State E may lead to the additional states F through K, and state L may lead to states M, N, and O and to states P through X. Each of these two paths will now be traced out in some detail by reference to the circuitry of Fig. 5.

In the case in which the relay R is not energized, as designated by the transition from state D to E in Fig. 6, the stepping switch in Fig. 5 continues its normal stepping action. This stepping can continue from state E through state K, in which the stepping switch reaches step 10. If the relay R operates as the stepping switch steps from steps 4 through 10, corresponding to leaving states E through K in Fig. 6, the alarm circuit is energized. With reference to Fig. 5, the connection to the alarm relay AL is provided by the common connection to step positions 5 through 10 on deck 1 of the stepping switch. This circuit is connected to a point adjacent step 5 and continues through the make contacts R and the make stepping contacts, along the lead at the top and right-hand side of the circuit diagram, through the $Z_2$ contacts to the negative potential point. The presence of the R make contacts in this circuit provides for the energization of the alarm relay whenever an R parity check failure occurs upon transition from states E through K.

With reference to Fig. 5, the stepping of the stepping switch to the tenth level automatically resets the switching circuit during the second portion of the timing cycle. This is accomplished by the negative potential coupled to the contact at level 10 of deck 3 of the stepping switch. This source of negative potential energizes relay T during the first half of the stepping cycle. During the second half-cycle, upon the closure of the break contacts $Z_2$, the reset coil 62 of the stepping switch is energized. It may be noted that this action is similar to that taken upon the transition from state D to state L as shown in Fig. 6 and discussed above. However, relays N and M are not energized in the case of a reset from the tenth step of the stepping switch in view of the lack of connections from the energization circuits of relays N and M to level 10 of deck 2 of the stepping switch. As in the previous case in which the energization of relay T was discussed, relay T is reset to the de-energized state by the opening of the off normal make contacts in its hold circuit following resetting of the stepping switch. Incidentally, it may be noted that the number of steps in the chain from states E through K is determined by long bursts of errors which may start with a check digit error.

In the foregoing paragraphs, the possible sequences of errors starting with an error which appeared to be a correctable check bit error have been considered. The class of error bursts indicated by the transition from state D to state L is that in which the initial error appears to be a correctable data bit error. The circuitry provided in Fig. 5 for examining subsequent error patterns and determining if the error bursts in this class are correctable will now be considered.

With reference to Fig. 6, the state diagram branches from state L to states M and P. In addition, in stepping up from the rest position in leaving state L, the circuit of Fig. 5 may enter state Y in which the alarm relay AL is energized. It may be noted that the alarm relay is energized on the occurrence of an S signal and in the absence of an R signal. From a physical standpoint, this corresponds to a state of facts as shown in Fig. 4, in which it has initially been determined that the information bit in shift register stage 4 is in error. Subsequently, the check bit digit shifted from stage 9 to stage 10 produces an error. This is clearly part of an oversized burst and the energization of the alarm relay is appropriate.

The three states M, N, and O correspond to situations in which a check bit error has not yet occurred. Following the occurrence of a check bit error, the state of circuit 5 shifts from state L, state M, or state N to state P. In all events, following state O, the transition to state P occurs. The states L, M, N, and O are characterized by the energization of both relay N and relay M. Following the transition to state P, however, the relay M drops out while relay N remains energized.

The transition from states L, M, and N to state P requires that relay R be energized, and that relay S be de-energized. Under these conditions, the R make contacts and the S break contacts are both closed. Now, with reference to Fig. 5, steps 1, 2, and 3 on deck 3 are connected to a negative potential point through the make contacts M, break contacts S, make contacts R, the make contacts of the stepping switch, and the make contacts $Z_2$. The T relay is therefore energized. When the T relay is energized, the T make contacts close the circuit between contacts 1 through 4 of deck 2 through the N make contacts to the positive side of the coil of relay M. It may be noted that a negative potential point is connected to the moving contact of deck 2 of the stepping switch. Accordingly, when the T make contacts close, both sides of the coil of relay M are at the same negative potential and the relay is de-energized. The resistor 65 is provided to avoid short-circuiting the power supply.

When the circuit of Fig. 5 is in state O, the next successive step of the stepping switch which momentarily reaches step 4 produces a transition to state P where the stepping switch is in the rest position. This is accomplished by the connection to contact 4 on deck 3 of the stepping switch, which energizes relay T if both relays M and N are energized and make contacts M and N are closed. In this event, a similar sequence of contact operations produces the result mentioned above, e.g., relay N remains energized and relay M drops out.

From states L and M, the energization of relay S without the energization of relay R shifts the circuit 5 to state Y, in which the alarm relay is energized. This action is accomplished by the connection to contacts 1 and 2 on deck 1 of the stepping switch. They are connected by the movable contact of the stepping switch to the alarm relay AL on the one side and to a negative potential point through the make contacts M, break contacts R, make contacts S, the stepping switch make contacts, and the $Z_2$ make contacts. The energization of the alarm relay circuit upon the occurrence of an S signal in leaving state N is accomplished by the circuitry coupled to contact 3 of deck 1 of the stepping switch. The negative potential is coupled to the alarm relay by the make contacts N, M, and S, the make contacts of the stepping switch, and the make contacts of the $Z_2$ relay.

The arrival at state P indicates that at least one data error has occurred, and further indicates that the circuit can tolerate only two additional check bit errors and no further data bit errors. These criteria may be verified by a consideration of the state of the decoder of Fig. 4 following a data bit error as indicated by the transition from state D to state L. Under these circumstances, the transition from state P or state Q to the alarm state Y occurs upon the energization of the S relay. Following state Q, no further new errors are permitted. Accordingly, the failure of the R parity circuit causes energization of the alarm signal.

The guard space between successive bursts of errors is provided by the steps indicated by states T through X of the state diagram of Fig. 6. Any additional errors which arrive at the decoder of Fig. 4 are sensed first by the R parity check circuit and immediately shift the circuit of Fig. 5 into alarm state Y. It may be noted that states W and X correspond closely to states F and G discussed above; that is, the stepping switch is in the fifth and sixth steps and is intended to step along progressively if relay R does not operate and to lockup the alarm relay if relay R does operate. As mentioned above, the energization circuit for the alarm relay AL includes the movable contact on deck 1 and the circuit coupled to contacts 5 and 6 of deck 1 including make contacts R, the make contacts of the stepping switch, and the $Z_2$ make contacts. For states T and U from which the stepping switch reaches contacts 3 and 4, respectively, the operate circuit for the alarm relay AL is much the same. Thus, from state T when the stepping switch reaches contact 3, the operate circuit for the alarm relay includes the make contacts N, the break contacts M and T, and the make contacts R in addition to the make contacts on the stepping and the $Z_2$ relays. Contact 4 is connected to the same general circuit through the break contacts of relay T. Upon attaining state X without the occurrence of an additional error, the switching circuit is reset to its rest position, or state A. This indicates that a sufficient guard space has passed that the circuit is prepared to correct further bursts of errors. The resetting operation is accomplished through the contacts on the seventh level associated with decks 2 and 3. More specifically, the contact associated with level 7 of deck 3 energizes relay T to start the usual reset cycle, and the application of negative potential to contact 7 of deck 2 shorts out relay N. The circuit of Fig. 5 is therefore again in its normal, or rest, condition with the stepping switch in its normal position and relays N, M, and T de-energized.

Once the alarm relay AL has been energized, it is necessary to operate the release push button having contacts designated PB in Fig. 5. The operation of the push-button contacts opens the hold circuits for the alarm, the N, and the M relays. It also includes contacts which reset the stepping switch. Two signal lamps are provided to indicate the state of the error detection circuit of Fig. 5. The yellow alarm light flashes during the operation of the circuit of Fig. 5 at any time when it is not in its rest position corresponding to state A in Fig. 6. The red alarm light is energized when the alarm relay is operated.

Figs. 7 through 11 are directed to a type of error correcting system which is very similar to the system of Figs. 1, 2, and 3, but in which the redundancy is much less. More specifically, in the system of Figs. 7 through 11, only one additional check bit is added for every three information bits, whereas in the circuit of Fig. 1 one check bit is employed for each information bit. The penalty paid for the reduction in redundancy is in the form of slightly more elaborate circuits, and a requirement for longer groups of correct digits between bursts of errors.

Figures 7, 8:
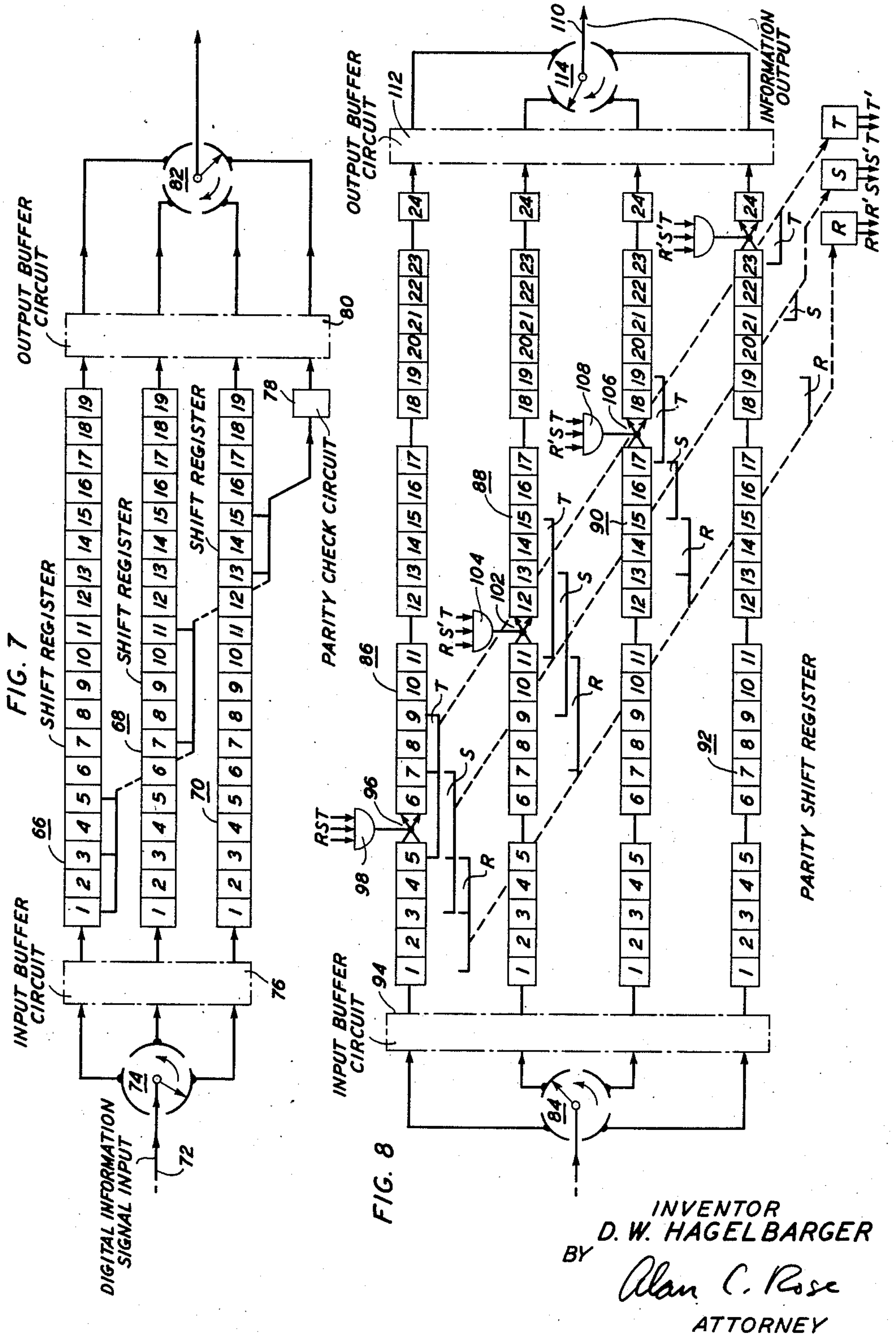
Fig. 7 is a schematic diagram of an encoder forming part of another illustrative embodiment of the invention.
Fig. 8 is a diagram of a decoder for use with the encoder of Fig. 7.

Turning now to the details of the system, Fig. 7 shows an encoder including three information digit shift registers 66, 68, and 70. Input digital information from lead 72 is distributed to the three shift registers 66, 68, and 70 by the switching circuit 74 and the input buffer circuit 76. The buffer circuits utilized in the systems disclosed in the present specification are relatively simple, and need store only a few bits, corresponding to the number of shift registers which are employed. The buffer circuit 76 is required to receive input digits at a high rate of speed from the input lead 72 and synchronize the distribution of digits to the three slower speed shift registers 66, 68, and 70. With this arrangement, one third of the input digits are routed to each of the three shift registers. The parity check circuit 78 derives signals from digit positions 1, 3, and 5 of shift register 66, from digit positions 7 and 11 of shift register 68, and from digit positions 13 and 15 of shift register 70. There are, of course, individual connections from each of these seven digit positions to the parity check circuit 78. In the schematic showing of Fig. 7, however, the single lead interconnecting the digit positions and the parity check circuit is shown in place of the many individual leads. The outputs from the shift registers 66, 68, and 70 and from the parity check circuit 78 are coupled by the buffer circuit 80 to the switching circuit 82. The switching circuit 82 samples the output of the three shift registers and then interleaves a parity check bit into the transmitted message before resampling the shift register output signals.

Fig 8 represents one decoder which may be used with the encoding circuit of Fig. 7. The input switching circuit 84 is synchronized with the output switching circuit 82 shown in Fig. 7, and distributes the incoming pulse signals to the four shift registers 86, 88, 90, and 92. The buffer circuit 94 is connected between the switching circuit 84 and the shift registers to synchronize the input pulses applied to the shift registers. Three parity group check circuits designated R, S, and T appear in the lower right-hand corner of Fig. 8. Each of the three parity group check circuits is connected to check a group of digits in accordance with the parity check group pattern established in the encoder of Fig. 7. Thus, for example, the parity group check circuit R samples signals from digit positions 1, 3, and 5 of register 86, from digit positions 7 and 11 of register 88, from digit positions 13 and 15 of register 90, and from digit position 19 of parity shift register 92. It may be observed that this grouping is precisely the same as that shown in Fig. 7. The parity group check circuit S checks a similar group of digit poistions which are shifted by two digit positions to the right with respect to those sampled by parity group check circuit R. Similarly, the digit positions checked by the circuit T are shifted two aditional positions to the right with respect to those checked by the check circuit S.

It may be observed that the error correction operation takes place between digit positions 5 and 6 in shift register 86. It may also be noted that digit position 5 is the only digit position which is included in the parity check groups of all three check circuits R, S, and T. Accordingly, when an erroneous digit reaches digit position 5, an output signal appears on leads R, S, and T, indicating a failure of parity as determined by all three parity group check circuits. The correction circuit 96 is operated to reverse the digit between digit positions 5 and 6 of shift register 86 when all three input signals R, S, and T are present at the input of the AND circuit 98.

Errors in the digits in shift register 88 are corrected between digit positions 11 and 12. Digit position 11 in shift register 88 is included in the parity groups checked by circuits R and T, but not in the parity group checked by circuit S. Accordingly, the error correction circuit 102 is enabled by inputs R, S', and T, which are coupled to the AND circuit 104. The signal S' is the Boolean algebraic symbol for the opposite or negated value of the binary quantity S. Thus, when lead S is de-energized, representing the binary symbol "0", lead S' is energized to represent a "1"; and when lead S is energized, lead S' is de-energized.

The digits in shift register 90 are corrected between digit positions 17 and 18. Digit position 17 is included in the parity groups checked by circuits S and T, but not in the parity group checked by circuit R. Accordingly, the correction circuit 106 is controlled by the output from the AND circuit 108 which has as inputs R', S, and T. It may also be noted that an error in digit position 23 of shift register 92 produces an output signal from the parity group check circuit T, but not from circuits R or S. Under these circumstances, the check digit may be corrected between digit positions 23 and 24, if this action is desired. The corrected information digits are coupled to the output circuit 110 by the buffer circuit 112 and the output switching circuit 114.

Figures 9, 10, 11:
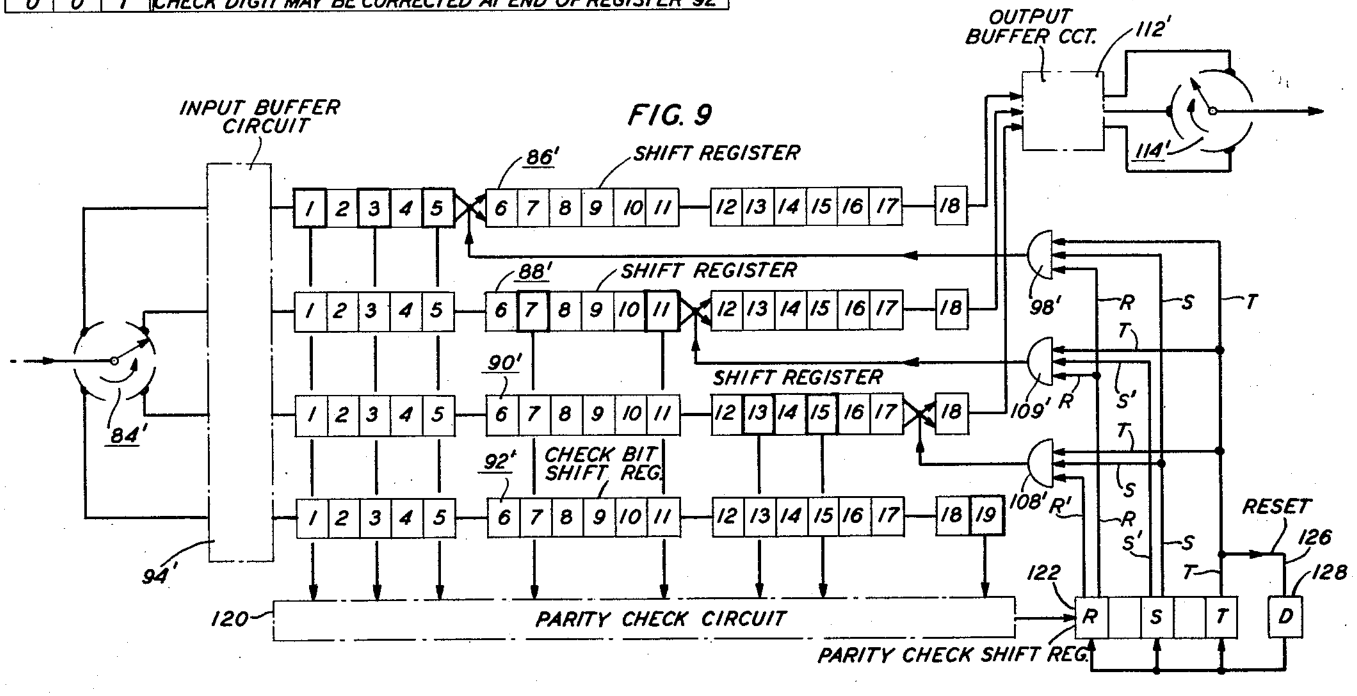
Fig. 9 is a schematic diagram of an alternative form of decoding circuit which may be employed with the encoder shown in Fig. 7.
Figs. 10 and 11 are diagrams useful in explaining the mode of operation of the system including the encoder of Fig. 7, and the decoder of Figs. 8 or 9.

Fig. 9 is a decoding circuit which may be used with the encoder of Fig. 7 instead of the decoder shown in Fig. 8. Many of the circuit components employed in Fig. 9 are the same as those of Fig. 8. Accordingly, the reference characters employed in Fig. 8 are carried to Fig. 9 in primed form for those circuits which perform comparable functions. The principal difference between the decoder of Fig. 9 and that of Fig. 8 is the use of a single parity check circuit 120 and a parity shift register 122 in place of the three separate parity check circuits R, S, and T of Fig. 8. The signals from the parity check circuit 120 are coupled to the five-digit position parity shift register 122 and the parity group check signals are shifted through the shift register 122 in synchronism with the shifting of information through the shift registers 86' through 92'.

It may readily be shown that the signals in the first, third, and fifth digit positions of the shift register 122 of Fig. 9 correspond to the signals in parity check circuits R, S, and T of Fig. 8 under comparable input signal conditions. Initially, it may be noted that the inputs to the parity check circuit 120 of Fig. 9 correspond to the inputs to parity check circuit R of Fig. 8. Furthermore, the successive two-digit position spacings of the parity circuits S and T with respect to the parity check circuit R in Fig. 8 correspond to the alternate digit position spacings designated S and T in Fig. 9 in the parity check shift register 122. The remainder of the circuitry shown in Fig. 9 operates in substantially the same manner as the comparable circuitry in the decoder of Fig. 8.

Circuitry for correcting the check digits is not shown in Fig. 9; suitable circuitry patterned after that shown in Fig. 8, may, of course, be provided. Correction of the check digits is desirable at an intermediate repeater point, but is not normally required at a terminal where the information is utilized.

Fig. 10 is a tabulation of the operation of the circuitry of Figs. 8 or 9 described above. In the table of Fig. 10, the energization of leads R, S, or T of Figs. 8 or 9 is represented by a "1," and the energization of leads R', S', or T' is represented by the symbol "0." As indicated in the first four rows of the table of Fig. 10, no correction action is required when lead T is not energized, with any combination of signals on leads R and S. When all three leads R, S, and T are energized, the digit in digit position 5 of shift register 92 or 92' is corrected as it is transferred to digit position 6. When only leads R and T are energized, the digit in digit position 11 of shift register 88 or 88' is corrected as it is transferred to digit position 12. Similarly, the digit in digit position 17 of shift register 90 or 90' may be corrected as it is transferred to digit position 18 when only leads S and T are energized. Finally, when lead T is energized and leads R and S are de-energized, the check digit may be corrected between digit positions 23 and 24 of the check shift register 92 or 92'. In passing, it may be noted that the second, third, and fourth check indications of Fig. 10 may be the beginning of one of the indications of rows 5 through 8 of this figure.

Referring again to Fig. 9, it may also be noted that the reset lead 126 is connected to lead T. Digit positions R, S, and T of shift register 122 are therefore reset to the "0" state whenever lead T is energized. Delay circuitry 128 is provided in series with lead 126 to insure an adequate pulse output from circuits R, S, and T prior to resetting. The resetting action is useful in avoiding interaction of one error correction group in shift register 122 with the next subsequent error correction group.

Fig. 11 is a diagram which shows the error characteristics for errors in each of the shift registers 86' through 92' of Fig. 9. Thus, the sequence of output signals of the form 10101 from the parity check circuit 120 of Fig. 9 indicates an error in shift register 86'. Similarly, a sequence of output signals of the form 10001 from the parity check circuit 120 indicates an error in shift register 88'. An error in shift register 90' is indicated by the sequence of output signals 00101. Finally, a sequence of output signals from parity group check circuit 120 of the form 00001 indicates an error in the check bit register 92'. The foregoing information relating to the error characteristics for shift registers 86', 88', 90', and 92' is shown in tabular form in Table I.

*Table I*

| Error Characteristic | Indicated Register of Fig. 8 or Fig. 9 |
|---|---|
| 10101 | Shift register 86 or 86'. |
| 10001 | Shift register 88 or 88'. |
| 00101 | Shift register 90 or 90'. |
| 00001 | Shift register 92 or 92'. |

In comparing Table I and the table of Fig. 10, it may be noted that the error characteristics of Table I may be changed into the parity check indications of Fig. 10 by deleting the "0's" which appear in the second and third bit places of each of the error characteristics. In the decoder of Fig. 8, the connection of the parity check circuits to digit positions which are spaced by one digit position from each other serves to eliminate the "0's" in the error characteristic as presented at the output of the parity check circuits R, S, and T. In the decoder of Fig. 9, the same function is accomplished by the use of the two extra digit positions in the parity check shift register 122 to space the digit positions designated R, S, and T.

Diagrams such as that of Fig. 11 and tables such as those of Fig. 10 and Table I are exceedingly useful tools in analyzing the capabilities of proposed coding schemes. More specifically, the table of Fig. 10 lists all possible combinations of outputs of the three parity group check circuits, and the last four rows indicate the four combinations representing correctable errors in the four shift registers.

The error characteristics shown in Table I represent the output during successive time intervals of a parity check circuit in response to single errors of digits in any of the four shift registers. The second and fourth columns in the error characteristics are isolating columns, and do not affect the parity check signals as indicated in the table of Fig. 10. This spacing of the effective error correction digits permits the independent correction of two successive erroneous digits in any one shift register.

Fig. 11 indicates the relative timing of the error characteristics of Table I for four consecutive erroneous message digits starting with the digit applied to shift register 86' of Fig. 9. The lowest row in Fig. 10 indicates the superposition of the staggered error characteristics of the first four rows. It may be seen that each characteristic is fully identifiable, and that there is no interaction between error characteristics. Furthermore, any individual error characteristic may be shifted by one digit position to left or right without interference. This corresponds to eliminating an error in a digit applied to a given shift register and inserting an error in another digit applied to the same shift register one digit earlier or later than the original digit. In general, however, it should be noted that error bursts which have a length greater than eight digits may cause interference, and thus may be uncorrectable.

It may also be noted with reference to Fig. 11 that one additional adjacent erroneous digit in each shift register may also be identified without interference with other error characteristics. Accordingly, any eight consecutive erroneous message digits (or selected digits from a group of eight consecutive message digits) may be corrected by the circuits of Figs. 8 or 9.

As mentioned above in connection with a comparison of Table I and Fig. 10, the second and fourth columns in the error characteristics of Table I are isolating columns, and permit the independent correction of two successive erroneous digits in any of the shift registers of Figs. 8 and 9. With this arrangement, eight consecutive erroneous received digits may be corrected. These guard digits may be deleted. This would have the effect of making Table I identical with the last four entries in Fig. 10. In addition, all of the columns of "0's" in Fig. 11 which are identified by arrows beneath the pattern of digits would be eliminated. The result of this change would be to reduce the length of bursts of errors which can be corrected from eight digits to four digits. The advantages of such a change would be the reduction in length of the shift registers employed at the encoding and decoding circuits, and a reduction in the guard space which must be free from errors between successive long bursts of errors. The system of Figs. 7, 8, and 9 could similarly be modified by the insertion of additional guard digits between the parity check indication codes listed in Fig. 10. Longer bursts could then be corrected with, however, the expected disadvantages of longer shift registers and the requirement for longer guard spaces between bursts of errors. The choice of one arrangement or the other depends largely on the nature of the transmission system. In cases where single errors occur very infrequently and the errors which do occur are in the form of extended bursts, one or more isolating digit spaces should be employed between the digits of the parity check indications. However, in cases where the frequency of error bursts is only slightly greater than the frequency of single errors, no isolation of the parity check indication digits would be desirable.

The circuit of Fig. 12 represents an error correction and detection circuit which is somewhat different from the circuits presented in previous figures included in the present specification. More particularly, it includes circuits for correcting short bursts of errors and for detecting longer bursts of errors. In addition, the check digits which are transmitted over the noisy transmission channel are formed by a parity check circuit which checks the parity of a group of digits including at least one additional check digit. The foregoing points will be developed in greater detail in the course of the description of Fig. 12.

In Fig. 12, the encoder circuitry includes a first shift register 134 in which only information digits are included, and another shift register 136 which includes only parity check bits. The information digit shift register 134 includes thirteen digit positions. The check bit shift register 136 includes only four digit positions, and these are designated digit positions 10 through 13. The parity check circuit 138 derives input signals from digit positions 1, 4, and 7 of shift register 134, and from digit position 13 of shift register 136. Information and check bits are interleaved by the switching circuit 140, and are applied to a noisy transmission channel 142. The switching circuit 144 applies information digits from the transmission channel 142 to shift register 146, and applies check bits to the shift register 148. Three parity group check circuits 150, 152, and 154 are coupled to digit positions in the shift registers 146 and 148 corresponding to the parity check groups established in the encoder. Thus, for example, parity group check circuit 150 receives input signals from digit positions 1, 4, and 7 of the information digit shift register 146, and from digit positions 10 and 13 of the parity check shift register 148. The parity group check circuits 152 and 154 are coupled to additional sets of five digits which are shifted successively by three digit positions with respect to those checked by parity group check circuit 150.

It may be noted that all three parity group check circuits 150, 152, and 154 are coupled to digit position 7 in shift register 146. Accordingly, if all three circuits produce output signals indicating an error in parity, the digit in digit position 7 is reversed as it is transferred to digit position 8 in shift register 146. This function is accomplished by the AND circuit 156 which controls the correction circuit 158.

It may also be noted that the parity check group circuits 150 and 152 both derive input signals from digit position 13 of the parity check circuit, and that parity check circuits 152 and 154 both derive input signals from digit position 16 of the parity check shift register 148. When the check digits in digit positions 13 or 16 are in error, therefore, the parity check circuits R and S, or S and T, respectively, will be energized. In the present circuits, however, it is not proposed to correct errors in check bits. Accordingly, output signals of the type described above which indicate parity check bit errors are ignored.

The operation of the circuit of Fig. 12 is indicated in tabular form in Fig. 12. The first row in Fig. 12 indicates the condition in which none of the parity group check circuits 150, 152, or 154 is energized, and represents the situation in which no errors are present. The next four rows of the table of Fig. 13 represent other parity group check signal combinations in which no action is required. Rows 2 through 4 constitute signals which may represent either a single information bit error or a single parity check error at some position in the decoder shift registers 146 or 148. When all three parity check circuits 150, 152, and 154 are energized, as indicated by the sixth row in the table of Fig. 13, the information bit in digit position 7 is corrected as it is transferred to digit position 8. This operation has been discussed above.

In the case of other combinations of output signals from the parity group check circuits R, S, and T (or 150, 152, and 154), it is desirable to energize an alarm circuit indicating that the error is not within the correction capabilities of the decoder circuit. The two parity group check sequences indicated in the last two rows of the table of Fig. 13 are utilized for error indication and serve to trigger an alarm circuit.

The alarm circuit 162 appears in the upper right-hand portion of the circuit of Fig. 12. The energization circuit for the alarm circuit 162 includes the OR circuit 164 and the two AND circuits 166 and 168. The input to the AND circuit 166 is the combination of R′, S, and T′ corresponding to the parity check group sequence 010 presented in the final row of Fig. 13. The energization circuits for the AND circuit 168 include leads R, S′, and T, which correspond to the parity check group sequence 101 in the next to last row of Fig. 13.

With the arrangements of Fig. 12 as described above, it has been systematically determined that no error bursts equal to or less than thirteen digits in length remain undetected or uncorrected. Furthermore, some bursts which are greater than thirteen digits in length are also corrected or detected by the circuit of Fig. 12. In addition, all error bursts including six consecutive erroneous digits in the transmitted message (or selected digits from a group of six consecutive message digits) are fully corrected, and some bursts which are greater than six digits in length are also corrected. The physical reason for the capability of the circuit of Fig. 12 to correct error bursts of six digits or less may be seen from a consideration of Fig. 14.

The diagram of Fig. 14 represents a series of data and check bits which are being transmitted along the noisy transmission channel 142. In Fig. 14, each of the data digits is designated by the capital letter D, and each of the check digits by the capital letter C. The line 170 is attached to a group of five arrows indicating the spacing of three information or data bits, and two check bits which are included in a single parity check group. Considering the data bit 172, which is included in the parity check group represented by the line 170 and its associated arrows, it is also included in the two additional parity check groups represented by lines 174 and 176 and their associated arrows. From the diagram of Fig. 14, it is apparent that errors in the check and data digits between those over which the parity check groups are formed do not affect the correction of information digits such as the digit designated 172 which are included in all three parity check groups. In view of the fact that successive digits included in a parity check group are spaced by at least five digits which are not included in the parity check group, it is clear that error bursts of six bits or less may be corrected by the circuit of Fig. 12.

Another embodiment of the invention will now be disclosed in connection with Figs. 15 through 18 of the drawing. This embodiment differs from arrangements disclosed above in the use of a single shift register at each of the two terminals. In addition, with a redundancy of one-third, the system of Figs. 15 through 18 constitutes a relatively simple circuit which utilizes the transmission facilities in a more economical manner than the system of Figs. 1 through 3.

The check pattern diagram of Fig. 15A is the starting point for the system. In this diagram, unique patterns representing errors in digits A, B, and C are established in staggered relationship with each other. These patterns determine the connections between the shift registers and the parity check circuits at the encoder and decoder. Note that the identification of digit A is 101, that of digit B is 110, and that of digit C, the check digit, is 100.

It may be noted that the use of one check bit for every two data bits requires the use of a three-bit identification code. This follows from the unavailability of code groups having all "0's," which indicate no errors, and the impossibility of distinguishing between the two error indication code groups 01 and 10, which each includes two digits. Once the necessity for employing three-bit error identification code groups is established, the code group 111 is avoided as requiring somewhat more complexity in the system than groups including only one or two "1's."

The check pattern of Fig. 15A as discussed above may be considered to correspond to that which would be employed in a decoding or correcting circuit employing parallel shift registers. The decoder may also be implemented in terms of a single long shift register. In this case, the check pattern takes the form shown in Fig. 15B. It may be noted that the pattern shown in Fig. 15B is merely a repetition of successive columns of Fig. 15A written in serial form. In the case of Figs. 15A and 15B, the three-digit error correction codes discussed above require that the error detection pattern be repeated three times. An implementation of the decoding pattern shown in Fig. 15B appears in the decoder of Fig. 16, and will be discussed in detail below. The pattern of Fig. 15C is derived directly from that of Fig. 15B by the omission of the check bit indications. Accordingly, the pattern of Fig. 15C corresponds to the desired inputs to the encoder parity check circuit.

With reference to Fig. 16, input digital data is applied to the shift register 200 on lead 202. The parity digit forming circuit 204 is connected to the stages of the shift register 200 in the manner indicated by the diagram of Fig. 15C. A check bit is interleaved between every two data bits A and B and applied to the data link 206. The resulting signals which appear on the data link 206 have the parity relationships indicated by the diagram of Fig. 15B.

The decoder of Fig. 16 includes the single long shift register 208 which is broken at three points 210, 212, and 214 to permit the correction of errors. Three parity check circuits 216, 218, and 220 are provided to give the three digits of the error correcting code groups mentioned above. The three parity check circuits 216, 218, and 220 are also designated R, S, and T, respectively. It may be noted that the connections from the shift register 208 to the R parity check circuit 216 follow the pattern indicated in Fig. 15B. Similarly, the S and T check circuits 218 and 220 have the same pattern of connections, but are shifted by successive blocks of three digits along the length of the register 208.

Erroneous digits appearing in the A position of digital words are corrected between stages 7 and 8 of shift register 208. This is accomplished by the AND circuit 222 which energizes the switching circuitry. The AND circuit 222 has as inputs the code pattern R, S', T, and an appropriate timing pulse. When the code pattern R, S', T corresponds to the original error correcting code 101 required to indicate an error in digit position A, the binary digit is negated in its transfer from shift register stage 7 to shift register stage 8. In a similar manner, correction of the B and C digits is controlled by the AND gates 224 and 226, respectively. When the patterns applied to these AND circuits correspond to the error correcting codes set forth in the table of Fig. 15A, the bits are negated in their transfer from one shift register stage to the next.

At the output from the final shift register stage 228 of the register 208, the data bits of both types have been corrected and the check bits have also been corrected. Under some circumstances, it may be desirable to transmit the coded groups including the check bits on to a remote decoder. However, a simple buffer circuit is provided to delete the corrected check bits when the information bits are to be utilized at once. Of course, in an actual system either the correction circuit for check digits or the circuit for deleting two check digits would not be included.

The timing considerations for the circuit of Fig. 16 are somewhat more complicated than that of earlier circuits in which parallel shift registers were employed at the decoder. In the circuit of Fig. 16, the timing is controlled by a clock circuit 230 which is synchronized through lead 232 with the incoming digital signals on lead 202. The clock 230 provides output signals at six equally spaced time intervals for every two incoming digits on lead 202. For the purposes of Fig. 16, it will be assumed that clock signals from circuit 230 are available at both the receiver and transmitter. In practice, a separate clock signal would be employed at the receiver, and suitable synchronizing apparatus which is well known in the art would be employed to synchronize the timing circuits at the two terminals.

Fig. 17 is a timing diagram for the encoder which appears in the upper portion of Fig. 16. Digits are shifted along the shift register 200 during intervals designated 1 and 4 in Fig. 17. The shift register control circuitry associated with each stage of the register 200 is indicated schematically by the block 234. Timing signals designated $CP_1$ and $CP_4$ are applied through an OR circuit 236 to the shifting circuitry 234. The output of the parity forming circuit 204 is sampled by the AND gate 238 by a clock pulse $CP_2$ which occurs in the second timing interval. The parity bit C is stored in the single bit register 240 and is gated out through the AND circuit 242 by a clock pulse $CP_4$ between the data bits B and A. The buffer circuit between the shift register 200 and the data link 206 includes the two OR circuits 244 and 246 and the AND circuit 248. Clock pulses $CP_2$ and $CP_6$ are applied to the AND gate 248 to gate data bits from register 200 through the OR circuit 246 to the data link 206. The relative output timing of the data bits A and B and the check bit C on the data link 206 is indicated in the final row of Fig. 17.

The timing of operations at the decoder is indicated in the diagram of Fig. 18. The shift register 208 at the decoder is operated at a higher rate than the encoder shift register 200. Accordingly, timing pulses $CP_2$, $CP_4$, and $CP_6$ are applied through the OR circuit 250 to the shifting control circuitry 252 associated with shift register 208. The output signals from all three of the parity check circuits 216, 218, and 220 are sampled during the third timing interval. This is indicated by the input $CP_3$ to each of the AND gates 254, 256, and 258 connected to the outputs of the respective parity check circuits. These parity group check signals are stored briefly in the single bit registers 260, 262, and 264 which are also designated R, S, and T, respectively. The signals stored in these single bit registers are sampled by clock pulses $CP_4$ which are applied to each of the AND circuits 222, 224, and 226.

As mentioned briefly above, the three-phase output from shift register stage 228 is changed into a two-phase output including only digits A and B at the output lead 266. The required buffering circuits include the AND gates 268, 270, and 272 in addition to the single bit register 274 and the OR circuit 276. The output from the shift register stage 228 is sampled by the AND gate 270 during timing interval 3 and is stored in the single bit register 274. As indicated by the final row of the timing diagram of Fig. 18, the output data bits designated A are transmitted to the output lead 266 during timing interval 4. This operation is accomplished by the AND gate 272 which has as one input a connection from the single bit register 274. Clock pulses $CP_4$ are applied to the other input of AND gate 272 to gate signals on through this AND circuit 272 and the OR circuit 276 to output lead 266. Data pulses designated B are gated directly from shift register stage 228 by clock pulses $CP_1$ applied to control the operation of AND gate 268. Accordingly, data bits A and B are coupled to output channel 266 and the check bits C are excluded from this output circuit.

In the foregoing detailed description, my invention has been described with reference to certain specific embodiments. For example, the shift register circuitry in the decoders of Figs. 1, 8, 9, and 12 has been shown as including spaced shift registers for the check digits and for the information digits. These registers could, of course, be instrumented in the form of a single long shift register with appropriately revised connections to the parity group check circuits to accomplish the same function, as shown in the decoder of Fig. 16. Similarly, the decoder of Fig. 16 could employ several shift registers in the style of the decoders of Figs. 1, 8, 9, and 12, for example.

In the described circuits, a single parity check group pattern of circuit connections has been employed in each system. In some cases, it may be desirable to reduce redundancy through the use of two or more distinct parity group patterns in a single system. It is contemplated that the continuous encoding and decoding techniques described above may be readily adapted to systems in which more than one parity check pattern is employed.

In addition, the circuits described in the foregoing detailed description have been developed on the basis of using binary digits. It is to be understood that systems using bases or radices greater than two may be implemented in accordance with the principles of my invention. For example, check digits may be formed by summing the input information digits included in the parity check in accordance with the modulus forming the basis of the digit system. Thus, if a parity check digit is to be formed to check two input decimal digits which were 7 and 9, for example, the resulting parity check digit would be 4. This number may be arrived at by adding 7 and 9 and subtracting it from the next higher decimal number ending with a 0. Mathematically, it may be stated as follows.

$$9+7=6 \pmod{10} \qquad (2)$$

The residue 6 is then subtracted from 10 to produce the check digit. The resulting check group includes the numbers 9, 7, and 4, which add up to 0(Mod 10). The changes in the circuitry required to carry through the implementation of the present circuits are indicated by the foregoing example.

In Figs. 3 and 4, which are the two figures which show detailed circuitry, a relay circuit implementation is disclosed. Other circuit techniques may, of course, be employed in the realization of the logic circuits disclosed in the drawing. For specific example, the well-developed serial binary computer technology is directly applicable. Through the use of computer techniques, pulse repetition rates upwards of a million pulses per second may be attained. In such realizations, delay lines would constitute the shift registers, the logic functions could be implemented with diodes, and sutiable levels would be maintained by electronic pulse regenerators.

It is to be understood that the above-described arrangements are illustrative of the application of the principles of the invention. Numerous other arrangements may be devised by those skilled in the art without departing from the spirit and scope of the invention.

What is claimed is:

1. In an error burst correcting signal transmission system, an encoder comprising shift register circuitry having a plurality of digit positions, means for applying a train of binary input information signals to said shift register circuitry, encoding means for checking the parity of digital information in at least two spaced digit positions in said register circuitry and for determining parity check digits, and means for inserting each parity check digit into said train of serial binary signals at a point spaced from the digits which are checked by said check digit, and control circuitry for shifting information by one digit position through the shift register circuitry and for repeating the parity check operation; a decoder; and a transmission channel subject to distortion interconnecting said encoder and said decoder; said decoder comprising shift register circuitry, means for shifting received information and check digits through said register circuitry by one digit position during successive shift intervals, first parity group circuit means for checking the parity of a first predetermined digit and additional digits corresponding to one of the parity checks formed at said encoder and for producing a first output parity check signal, said first parity group circuit means comprising means for including at least one new digit in the parity check group during each shift interval, second parity group circuit means for checking the parity of said first predetermined digit and a different combination of additional digits which corresponds to another of the parity checks formed at said encoder and for producing a second output parity check signal, and means responsive to at least said two output parity check signals for correcting erroneous received digits.

2. In an error burst correcting signal transmission system, an encoder comprising shift register circuitry having a plurality of digit positions, means for applying a train of binary input information signals to said shift register circuitry, encoding means for checking the parity of digital information in at least two spaced digit positions in said register circuitry and for determining parity check digits, and means for inserting each parity check digit into said train of serial binary signals at a point spaced from the digits which are checked by said check digit, and control circuitry for shifting information by one digit position through the shift register circuitry and for repeating the parity check operation; a decoder; and a transmission channel subject to distortion interconnecting said encoder and said decoder; said decoder comprising shift register circuitry, means for shifting received information and check digits through said register circuitry, circuit means for checking the parity of a first predetermined digit and additional digits corresponding to one of the parity checks formed at said encoder and for producing a first output parity check signal, circuit means for checking the parity of said first predetermined digit and a different combination of additional digits which corresponds to another of the parity checks formed at said encoder and for producing a second output parity check signal, and means responsive to at least said two output parity check signals for correcting erroneous received digits.

3. A system as defined in claim 2 wherein said decoder includes a parity check shift register and a parity group check circuit connected to said parity check shift register.

4. In a burst correcting digital system, an encoder comprising shift register circuitry having a plurality of digit positions, means for applying a train of binary input information signals to said shift register circuitry, encoding means for checking the parity of digital information in at least two spaced digit positions in said register circuitry and for determining parity check digits, means for inserting each parity check digit into said train of serial binary signals at a point spaced from the digits which are checked by said check digit; a decoder; and a data link subject to distortion interconnecting said encoder and said decoder; said decoder comprising shift register circuitry, means for shifting received information and check digits progressively through said register circuitry, means for checking the validity of at least two of the parity check operations which include a common digit and for producing corresponding output parity check signals, and means responsive to at least said two output parity check signals for correcting erroneous received digits.

5. In a burst correcting digital system, an encoder comprising shift register circuitry having a plurality of digit positions, means for applying a train of digital input information signals to said shift register circuitry, encoding means for summing digital information in at least two spaced digit positions in said register circuitry and for determining corresponding check digits, means for inserting each check digit into said train of serial digital signals at a point spaced from the digits which are checked by said check digit; a decoder; a data link subject to distortion interconnecting said encoder and said decoder; said decoder comprising shift register circuitry, means for shifting received information and check digits progressively through said register circuitry, circuit means for checking the validity of at least two of the checking operations performed at said encoder which include a common digit and for producing two corresponding output check signals, and means responsive to at least said two output check signals for correcting erroneous received digits.

6. A digital system as defined in claim 5 wherein means are provided for transmitting at least two information digits for every check digit which is transmitted.

7. A digital system as defined in claim 5 wherein error detection circuitry is provided at said decoder for indicating errors which are beyond the normal error correction capabilities of the decoder, said detection circuitry including means responsive to said output check signals for tentatively classifying errors as information or check digit errors, means for determining departures from correctable sequences in which the error appears to be an information digit, and additional means for determining departures from correctable sequences in which the error initially appears to be a check digit.

8. A digital system as defined in claim 5 wherein error detection circuitry is provided at said decoder for indicating errors which are beyond the normal error correction capabilities of the decoder, said detection circuitry including means for tentatively classifying errors, and means for sequentially determining departures from correctable sequences in each class of errors.

9. In a burst correcting digital system, an encoder comprising shift register circuitry having a plurality of digit positions, means for applying a train of binary input information signals to said shift register circuitry, encoding means for checking the parity of digital information in at least two spaced digit positions in said register circuitry and for determining parity check digits, means for inserting each parity check digit into said train of serial binary signals at a point spaced from the digits which are checked by said check digit; a decoder; and a data link subject to distortion interconnecting said encoder and said decoder; said decoder comprising shift register circuitry, means for shifting received information and check digits progressively through said register circuitry, circuit means for checking the parity of a first predetermined digit and additional digits corresponding to one of the parity checks formed at said encoder and for producing a first output parity check signal, circuit means for checking the parity of said first predetermined digit and a different combination of additional digits which corresponds to another of the parity checks formed at said encoder and for producing a second output parity check signal, and means responsive to at least said two output parity check signals for correcting erroneous received digits.

10. In combination, a shift register, means for applying a train of digits to the shift register, means for progressively shifting information through the shift register during successive shift intervals, check circuit means connected to at least two spaced digit positions in the shift register for forming check digits, and switching means for interleaving each of said check digits into said train of digits at a point spaced from digits which are checked by said check digit.

11. A combination as defined in claim 10 wherein said switching means includes circuitry means for transmitting at least two of the original train of digits for every check digit which is transmitted.

12. In combination, an encoder, a decoder, and means interconnecting said encoder and said decoder; said encoder comprising a shift register, means for applying a train of digits to the shift register, means for progressively shifting information through the shift register during successive shift intervals, check circuit means connected to at least two spaced digit positions in the shift register for forming check digits, and means for interleaving said check digits into said train of digits at a point spaced from digits which are checked by said check digit; said decoder comprising a check digit shift register and at least one additional shift register, means for applying check digits only to said check digit shift register, and a parity check circuit connected to one digit position of said check digit shift register and to at least two spaced digit positions of the other decoder shift register.

13. In an error burst correcting digital system, an encoder comprising shift register circuitry having a plurality of digit positions, means for applying a train of digital input information signals to said shift register circuitry, encoding means for summing digital information in at least two spaced digit positions in said register circuitry and for determining corresponding check digits, means for inserting each check digit into said train of serial signals; a decoder; a data link subject to distortion interconnecting said encoder and said decoder; said decoder comprising shift register circuitry, means for shifting received information and check digits progressively through said register circuitry, circuit means for checking the validity of at least two of the checking operations performed at said encoder which included a common digit and for producing two corresponding output check signals, and means responsive to at least said two output check signals for correcting erroneous received digits.

14. In combination, an encoder, a decoder, and means interconnecting said encoder and said decoder; said encoder comprising a shift register, means for applying a train of digits to the shift register, means for progressively shifting information through the shift register during successive shift intervals, check circuit means connected to at least two spaced digit positions in the shift register for forming check digits, and means for interleaving said check digits into said train of digits; said decoder comprising a check digit shift register and at least one additional shift register, means for applying check digits only to said check digit shift register, and a parity check circuit connected to one digit position of said check digit shift register and to at least two spaced digit positions of the other decoder shift register.

15. In combination, an encoder including means for adding check digits to a train of input information digits; a decoder; and means interconnecting said encoder and said decoder; said decoder including shift register circuitry, first and second parity check group circuits each having at least three input connections from different digit positions of said shift register circuitry, one of said connections to each of said check circuits being derived from the same digit position, and means responsive to the output signals from said check group circuits for correcting errors in received information digits.

16. A combination as defined in claim 15 wherein said decoder shift register circuitry includes separate check and information digit shift registers.

17. A combination as defined in claim 15 wherein said decoder shift register circuitry includes only a single extended shift register to which both information and check digits are applied.

18. A combination as defined in claim 15 wherein said decoder shift register circuitry includes at least two information digit shift registers and one check digit shift register.

19. In an error correction and detection system in which information and check digits are transmitted from a transmitter to a receiver, error correction circuitry associated with the receiver, an alarm circuit, detection circuitry responsive to groups of errors which are beyond the normal correction capabilities of said error correction circuitry for energizing said alarm circuit, said detection circuitry including means for tentatively classifying errors as information or check digit errors, means for determining departures from correctable sequences in which the error initially appears to be an information digit, and additional means for determining departures from correctable sequences in which the error initially appears to be a check digit.

20. A system for correcting error bursts comprising a shift register, means for applying a train of digital information to said shift register, a parity check forming circuit connected to two spaced digit positions of said shift register, switching means for interleaving the digital output signal from said check forming circuit into said train of digital information at a point spaced from the digits included in the parity check, a data link coupled to said switching means, a decoder check digit shift register and a decoder information digit shift register, additional switching means for coupling digital information from said data link to said decoder shift registers, a first check group circuit connected to two information digit positions and one check digit position of said decoder shift registers, a second check group circuit having one connection in common with said first check group circuit and additional connections to decoder shift register digit positions, means for correcting an erroneous digit in said information digit shift register, and logic circuit means responsive to the output of said check group circuits for controlling the operation of said digit correction circuit.

21. A decoder for transmitted digital signals including check and information digits comprising shift register circuitry, a first parity group check circuit including inputs from at least three spaced shift register digit positions including at least one check and at least one information digit position, a second parity group check circuit including inputs from at least three shift register digit positions including at least one correction from a digit position which is also coupled to said first check circuit, error recognition circuitry, and means responsive to the output signals from said check circuits for enregizing said error recognition circuitry.

22. In combination, means for providing a digital message including check digits and information digits, shift register circuitry, means for registering the information digits included in said message in said shift register circuitry, means for registering check digits, and a parity check circuit connected to said check digit registration means and to two spaced digit positions in said information digit shift register circuitry which correspond to digits which are spaced apart in said message from the check digit registered in said check digit registration means.

23. A digital encoder comprising an information digit shift register and a check digit shift register, a check circuit having inputs from digit positions of said information and check digit shift registers, means for applying signals from said check circuit to said check digit shift register, and means for combining the output signals from said information and check digit shift registers.

24. In combination, a source of digital information, encoding means for forming check digits from combinations of the digits from said source, means for transmitting said check digits and said digital input information, a decoder including shift register circuitry for receiving the check and information digits, check group circuit means coupled to check and information digit positions of said shift register circuitry for producing digital error signals, an error signal shift register coupled to receive signals from said check circuit means and error responsive circuitry coupled to a plurality of digit positions of said error signal shift register.

25. A circuit as defined in claim 24 wherein error correction circuitry is associated with said decoded shift register circuitry and wherein said error responsive circuitry energizes said error correction circuitry upon the occurrence of at least one predetermined digital pattern in said error signal shift register.

26. In combination, a source of digital information, encoding means for forming check digits from combinations of the digits from said source, means for interleaving said check digits with said digital input information, a decoder including shift register circuitry for receiving the interleaved check and information digits, check group circuit means coupled to a plurality of digit positions of said shift register circuitry for producing digital error signals, an error signal shift register coupled to receive signals from said check circuit means, and error responsive circuitry coupled to a plurality of digit positions of said error signal shift register.

References Cited in the file of this patent

UNITED STATES PATENTS

| | | |
|---|---|---|
| 2,552,629 | Hamming et al. | May 15, 1951 |
| 2,653,996 | Wright et al. | Sept. 29, 1953 |
| 2,688,656 | Wright et al. | Sept. 7, 1954 |
| 2,730,700 | Serrell | Jan. 10, 1956 |